(12) United States Patent
Harada

(10) Patent No.: US 12,541,088 B2
(45) Date of Patent: Feb. 3, 2026

(54) OBJECTIVE OPTICAL SYSTEM FOR ENDOSCOPE AND ENDOSCOPE

(71) Applicant: FUJIFILM Corporation, Tokyo (JP)

(72) Inventor: Keisuke Harada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 720 days.

(21) Appl. No.: 17/813,251

(22) Filed: Jul. 18, 2022

(65) Prior Publication Data
US 2022/0382039 A1    Dec. 1, 2022

Related U.S. Application Data

(63) Continuation of application No. PCT/JP2021/001734, filed on Jan. 19, 2021.

(30) Foreign Application Priority Data

Jan. 29, 2020    (JP) .................................. 2020-012967
Jan. 13, 2021    (JP) .................................. 2021-003772

(51) Int. Cl.
*G02B 23/24*    (2006.01)
*G02B 9/04*    (2006.01)
(Continued)

(52) U.S. Cl.
CPC .............. *G02B 23/243* (2013.01); *G02B 9/04* (2013.01); *G02B 23/02* (2013.01); *G02B 7/021* (2013.01)

(58) Field of Classification Search
CPC . G02B 5/04; G02B 23/02; G02B 9/64; G02B 13/007; G02B 23/243;
(Continued)

(56) References Cited

U.S. PATENT DOCUMENTS 4,037,938 A * 7/1977 Yamashita ........... G02B 23/243
                                                       359/740
5,777,797 A * 7/1998 Miyano .................... G02B 9/34
                                                       600/176
(Continued)

FOREIGN PATENT DOCUMENTS

CN    111856709 A    10/2020
JP    H10-73762 A    3/1998
(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*
(Continued)

*Primary Examiner* — Pinping Sun
(74) *Attorney, Agent, or Firm* — Studebaker Brackett PLLC

(57) ABSTRACT

An objective optical system for an endoscope consisting of, in order from an object side toward an image side: a front group; and a rear group, wherein: the front group consists of, in order from the object side toward the image side: one negative lens; an optical path deflecting prism; an aperture stop; and one positive lens. The objective optical system for an endoscope satisfies a predetermined conditional expression.

14 Claims, 35 Drawing Sheets

(51) Int. Cl.
*G02B 23/02* (2006.01)
*G02B 7/02* (2021.01)

(58) Field of Classification Search
CPC ...... G02B 23/2415; G02B 7/001; G02B 9/04; G02B 7/021; G02B 27/0012; G02B 27/0025; A61B 1/00002–00009; A61B 1/04–055; A61B 1/00; G06T 2207/10068
See application file for complete search history.

(56) References Cited

U.S. PATENT DOCUMENTS

| | | | |
|---|---|---|---|
| 8,684,915 B2* | 4/2014 | Katakura | A61B 1/00096 359/226.1 |
| 2003/0043289 A1 | 3/2003 | Konno | |
| 2008/0180809 A1* | 7/2008 | Igarashi | A61B 1/00188 359/689 |
| 2009/0296235 A1* | 12/2009 | Igarashi | G02B 23/243 359/720 |
| 2017/0285322 A1* | 10/2017 | Inoue | G02B 13/04 |
| 2018/0028050 A1 | 2/2018 | Zhao et al. | |
| 2020/0000321 A1 | 1/2020 | Zhao et al. | |
| 2020/0341262 A1 | 10/2020 | Inoue | |

FOREIGN PATENT DOCUMENTS

| | | | |
|---|---|---|---|
| JP | 2002-357773 A | | 12/2002 |
| JP | 2006039259 A | * | 2/2006 |
| JP | 2007108704 A | * | 4/2007 |
| JP | 2008-107391 A | | 5/2008 |
| JP | 2009198721 A | * | 9/2009 |
| JP | 4827391 B2 | | 11/2011 |
| JP | 2017-219783 A | | 12/2017 |
| JP | 2020-013146 A | | 1/2020 |

OTHER PUBLICATIONS

International Search Report issued in PCT/JP2021/001734; mailed Mar. 30, 2021.
Written Opinion of the International Searching Authority issued in PCT/JP2021/001734; mailed Mar. 30, 2021.
An Office Action; "Notice of Reasons for Refusal," mailed by the Japanese Patent Office on May 9, 2023, which corresponds to Japanese Patent Application No. 2021-574659 and is related to U.S. Appl. No. 17/813,251; with English language translation.
An Office Action mailed by the State Intellectual Property Office of the People's Republic of China on Sep. 23, 2023, which corresponds to Chinese Patent Application No. 202180010775.5 and is related to U.S. Appl. No. 17/813,251; with English language translation.

* cited by examiner

OBJECTIVE OPTICAL SYSTEM FOR ENDOSCOPE AND ENDOSCOPE

CROSS REFERENCE TO RELATED APPLICATIONS

The present application is a Continuation of PCT International Application No. PCT/JP2021/001734, filed on Jan. 19, 2021, which claims priority to Japanese Patent Application No. 2020-012967, filed on Jan. 29, 2020, and No. 2021-003772, filed on Jan. 13, 2021. Each application above is hereby expressly incorporated by reference, in its entirety, into the present application.

BACKGROUND

Technical Field

The present disclosure relates to an objective optical system for an endoscope and an endoscope.

Related Art

In the related art, endoscopes have been used for an observation, treatment, and the like for the inside of a patient's body in a medical field. JP4827391B discloses a lens system that can be used as an objective optical system for an endoscope.

In recent years, there has been a demand for an objective optical system for an endoscope that has a wide angle of view, a small size, and good optical performance.

SUMMARY

The present disclosure provides an objective optical system for an endoscope that has a wide angle of view, a small size, and good optical performance, and an endoscope comprising the objective optical system for an endoscope.

An objective optical system for an endoscope according to a first aspect of the present disclosure consists of, in order from an object side toward an image side, a front group and a rear group. The front group consists of, in order from the object side toward the image side, one negative lens, an optical path deflecting prism, an aperture stop, and one positive lens; and the rear group includes a plurality of cemented lenses each of which is formed of a positive lens and a negative lens cemented to each other. In a case where an Abbe number of the positive lens of the cemented lens closest to the object side with respect to a d line is denoted by vpa, an Abbe number of the negative lens of the cemented lens closest to the object side with respect to the d line is denoted by vna, an Abbe number of the positive lens of the cemented lens closest to the image side with respect to the d line is denoted by vpb, an Abbe number of the negative lens of the cemented lens closest to the image side with respect to the d line is denoted by vnb, a distance on an optical axis between the aperture stop and a cemented surface of the cemented lens closest to the object side is denoted by Lca, a distance on the optical axis between the aperture stop and a cemented surface of the cemented lens closest to the image side is denoted by Lcb, a curvature radius of the cemented surface of the cemented lens closest to the object side is denoted by Rca, a curvature radius of the cemented surface of the cemented lens closest to the image side is denoted by Rcb, a focal length of the entire system is denoted by f, and a focal length of the rear group is denoted by fg, Conditional expression (1) is satisfied, which is represented by $$250 < \left| (vna - vpa) \times \frac{Lca}{Rca} \right| \times \left| (vnb - vpb) \times \frac{Lcb}{Rcb} \right| \times \frac{f}{fg} < 1000. \quad (1)$$

In the first aspect of the present disclosure, it is preferable that Conditional expression (1-1) is satisfied, which is represented by $$300 < \left| (vna - vpa) \times \frac{Lca}{Rca} \right| \times \left| (vnb - vpb) \times \frac{Lcb}{Rcb} \right| \times \frac{f}{fg} < 800. \quad (1-1)$$

An objective optical system for an endoscope according to a second aspect of the present disclosure consists of, in order from an object side toward an image side, a front group and a rear group. The front group consists of, in order from the object side toward the image side, one negative lens, an optical path deflecting prism, an aperture stop, and one positive lens; and the rear group includes a plurality of cemented lenses each of which is formed of a positive lens and a negative lens cemented to each other. In a case where a total number of the cemented lenses is denoted by k, a natural number in a range of 1 to k is denoted by i, an Abbe number of the positive lens of the i-th cemented lens from the object side with respect to a d line is denoted by vpi, an Abbe number of the negative lens of the i-th cemented lens from the object side with respect to the d line is denoted by vni, a distance on an optical axis between the aperture stop and a cemented surface of the i-th cemented lens from the object side is denoted by Lci, a curvature radius of the cemented surface of the i-th cemented lens from the object side is denoted by Rci, a focal length of the front group is denoted by ff, and a focal length of the rear group is denoted by fg, Conditional expression (2) is satisfied, which is represented by $$300 < \left( \sum_{i=1}^{k} \left| (vni - vpi) \times \frac{Lci}{Rci} \right| \right) \times \left| \frac{ff}{fg} \right| < 2000. \quad (2)$$

In the second aspect of the present disclosure, it is preferable that Conditional expression (2-1) is satisfied, which is represented by $$500 < \left( \sum_{i=1}^{k} \left| (vni - vpi) \times \frac{Lci}{Rci} \right| \right) \times \left| \frac{ff}{fg} \right| < 1500. \quad (2-1)$$

According to a third aspect of the present disclosure, in the aspect, it is preferable that the rear group includes, in order from a side closest to the object side toward the image side, one cemented lens and a positive lens or one cemented lens.

According to a fourth aspect of the present disclosure, in the aspect, in a case where a back focus of the entire system at an equivalent air path is denoted by Bf and the focal length of the entire system is denoted by f, it is preferable that Conditional expression (3) is satisfied, which is represented by $$0.95 < Bf/f < 2 \quad (3), \text{ and}$$

it is more preferable that Conditional expression (3-1) is satisfied, which is represented by $$1 < Bf/f < 1.8 \tag{3-1}$$

According to a fifth aspect of the present disclosure, in the aspect, in a case where a curvature radius of a surface of the negative lens of the front group facing the image side is denoted by Rr1, a curvature radius of a surface of the negative lens of the front group facing the object side is denoted by Rf1, and a focal length of the entire system is denoted by f, and a focal length of the negative lens of the front group is denoted by f1, it is preferable that Conditional expression (4) is satisfied, which is represented by $$0.95 < \frac{Rr1 + Rf1}{Rr1 - Rf1} \times \frac{f}{f1} < 1.32, \tag{4}$$

and it is more preferable that Conditional expression (4-1) is satisfied, which is represented by $$1 < \frac{Rr1 + Rf1}{Rr1 - Rf1} \times \frac{f}{f1} < 1.28. \tag{4-1}$$

According to a sixth aspect of the present disclosure, in the aspect, in a case where a curvature radius of a surface of the negative lens of the front group facing the image side is denoted by Rr1, a curvature radius of a surface of the negative lens of the front group facing the object side is denoted by Rf1, and a refractive index of the negative lens of the front group with respect to the d line is denoted by Nd1, it is preferable that Conditional expression (5) is satisfied, which is represented by $$-1.02 < \left(\frac{Rr1 + Rf1}{Rr1 - Rf1}\right) / Nd1 < -0.75, \tag{5}$$

and it is more preferable that Conditional expression (5-1) is satisfied, which is represented by $$-1 < \left(\frac{Rr1 + Rf1}{Rr1 - Rf1}\right) / Nd1 < -0.8. \tag{5-1}$$

According to a seventh aspect of the present disclosure, in the aspect, in a case where a distance on the optical axis between the aperture stop and a lens surface closest to the object side is denoted by Lf, a refractive index of the optical path deflecting prism with respect to the d line is denoted by Ndp, and a focal length of the negative lens of the front group is denoted by f1, it is preferable that Conditional expression (6) is satisfied, which is represented by $$0.75 < |Lf/(Ndp \times f1)| < 1 \tag{6, and}$$

it is more preferable that Conditional expression (6-1) is satisfied, which is represented by $$0.8 < |Lf/(Ndp \times f1)| < 0.95 \tag{6-1}$$

According to an eighth third aspect of the present disclosure, in the aspect, it is preferable that the optical path deflecting prism includes at least one surface for bending the optical path by using total reflection.

An objective optical system for an endoscope according to a ninth aspect of the present disclosure consists of, in order from an object side toward an image side, a front group and a rear group having positive focal power. The front group consists of, in order from the object side toward the image side, one negative lens, an optical path deflecting prism, an aperture stop, and one positive lens; the optical path deflecting prism consists of, in order from the object side toward the image side, a first prism and a second prism separated from the first prism with an air gap therebetween; and a ray incident on the optical path deflecting prism passes through the air gap and an optical path of the ray is then bent by total reflection on an interface between the air gap and the optical path deflecting prism. In a case where a focal length of the entire system is denoted by f, the air gap between the first prism and the second prism is denoted by Dp, an absolute value of an angle between an incident surface of the first prism and an optical axis of the rear group is denoted by θ1, an absolute value of an angle between an incident surface of the second prism and the optical axis of the rear group is denoted by θ2, and units of θ1 and θ2 are degrees, Conditional expressions (7) and (8) are satisfied, which are represented by $$30 < f/Dp < 500 \tag{7, and}$$

$$5 < |θ1 - θ2| < 45 \tag{8}$$

In the ninth aspect of the present disclosure, it is preferable that at least one of Conditional expression (7-1) or Conditional expression (8-1) is satisfied, which are represented by $$50 < f/Dp < 300 \tag{7-1, or}$$

$$7 < |θ1 - θ2| < 30 \tag{8-1, and}$$

it is more preferable that both Conditional expression (7-1) and Conditional expression (8-1) are satisfied.

According to a tenth aspect of the present disclosure, in the ninth aspect, in a case where a geometric length of an optical path of an on-axis principal ray in the first prism is denoted by GLf and a geometric length of an optical path of an on-axis principal ray in the second prism is denoted by GLs, it is preferable that Conditional expression (9) is satisfied, which is represented by $$60 < (GLf + GLs)/Dp < 600 \tag{9, and}$$

it is more preferable that Conditional expression (9-1) is satisfied, which is represented by $$100 < (GLf + GLs)/Dp < 500 \tag{9-1}$$

According to an eleventh aspect of the present disclosure, in the ninth and tenth aspects, in a case where a geometric length of an optical path of an on-axis principal ray in the first prism is denoted by GLf, a geometric length of an optical path of an on-axis principal ray in the second prism is denoted by GLs, and an average value of refractive indexes of the first and second prisms with respect to a d line is denoted by Ndp, it is preferable that Conditional expression (10) is satisfied, which is represented by $$1 < (GLs/GLf)/Ndp < 2.5 \tag{10, and}$$

it is more preferable that Conditional expression (10-1) is satisfied, which is represented by $$2 < (GLs/GLf)/Ndp < 2.2 \tag{10-1}$$

According to a twelfth aspect of the present disclosure, in the ninth to eleventh aspects, in a case where a maximum total angle of view of the objective optical system for an endoscope is denoted by 2ω, an average value of refractive indexes of the first and second prisms with respect to a d line is denoted by Ndp, and a unit of 2ω is a degree, it is preferable that Conditional expression (11) is satisfied, which is represented by $$8.8<(2\omega \times Ndp)/|\theta 1-\theta 2|<25 \qquad (11),\text{ and}$$

it is more preferable that Conditional expression (11-1) is satisfied, which is represented by $$9<(2\omega \times Ndp)/|\theta 1-\theta 2|<22 \qquad (11\text{-}1).$$

An endoscope according to a thirteenth aspect of the present disclosure comprises the objective optical system for an endoscope according to the aspect.

According to a fourteenth aspect of the present disclosure, in the thirteenth aspect, it is preferable that the endoscope further comprises an image pickup element disposed on an image plane of the objective optical system for an endoscope, the front group and the rear group are adapted to be movable rotationally about an optical axis of the rear group relative to each other, and the image pickup element is formed integrally with the rear group.

"Consisting of" and "consist of" in this specification may intend to include: a lens substantially not having focal power; optical elements other than a lens, such as a stop, a filter, and a cover glass; a lens flange; a lens barrel; an image pickup element; and the like in addition to mentioned components.

In this specification, "~ group having positive focal power" means that a group has positive focal power as a whole. "~ group" is not limited to a configuration where ~ group consists of a plurality of lenses and may have a configuration where ~ group consists of only one lens. "Lens having positive focal power" and "positive lens" are synonymous with each other. "Lens having negative focal power" and "negative lens" are synonymous with each other.

A complex aspherical lens (that is, a lens in which a spherical lens and an aspherical film formed on the spherical lens are integrated and which functions as one aspherical lens as a whole) is treated as one lens without being regarded as a cemented lens. The sign of focal power, the curvature radius of the lens surface, and the shape of the lens surface of a lens including an aspherical surface are considered in a paraxial region unless otherwise specified. In regard to the sign of a curvature radius, the sign of the curvature radius of a surface having a convex shape toward the object side is positive and the sign of the curvature radius of a surface having a convex shape toward the image side is negative.

"The entire system" means "the objective optical system for an endoscope". The "Focal length" used in Conditional expressions is a paraxial focal length. The values of Conditional expressions are values that are obtained in a case where a d line is used as a reference. "d line", "C line", and "F line" described in this specification are emission lines, and the wavelength of a d line is 587.56 nm (nanometer), the wavelength of a C line is 656.27 nm (nanometer), and the wavelength of an F line is 486.13 nm (nanometer).

According to the aspects, an objective optical system for an endoscope according to an exemplary embodiment of the present disclosure and an endoscope comprising the objective optical system for an endoscope have a wide angle of view, a small size, and good optical performance.

DETAILED DESCRIPTION

First Exemplary Embodiment

Figure 1:
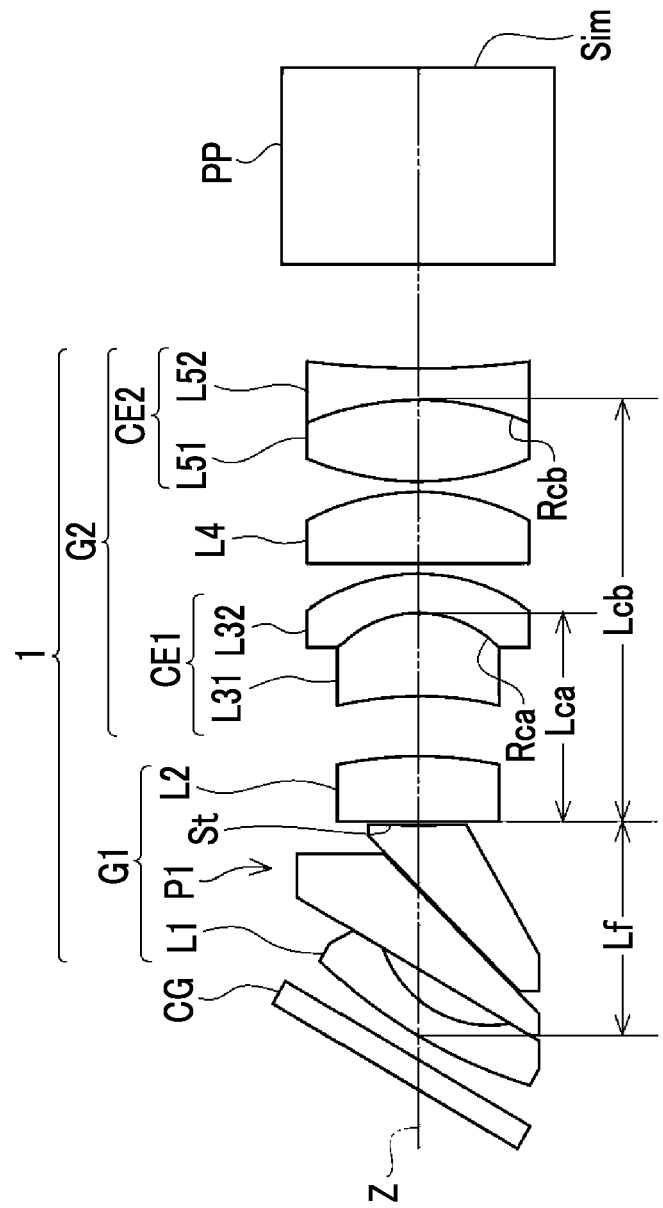
FIG. 1 is a cross-sectional view showing the configuration of an objective optical system for an endoscope according to an exemplary embodiment of the present disclosure.

A first exemplary embodiment, which is an exemplary embodiment of the present disclosure, will be described in detail below with reference to the drawings. FIG. 1 is a cross-sectional view showing the configuration of an objective optical system 1 for an endoscope according to the first exemplary embodiment. In FIG. 1, a left side is an object side and a right side is an image side. An optical axis Z shown in FIG. 1 is the optical axis of a rear group G2. An example shown in FIG. 1 corresponds to Example 1 to be described later and is an objective optical system for an oblique-viewing endoscope in which on-axis luminous flux from an object to a front group G1 is not parallel to the optical axis Z and is inclined with respect to the optical axis Z.

FIG. 1 shows an example in which a cover glass CG is disposed on the object side of the objective optical system 1 for an endoscope and an optical member PP is disposed on the image side of the objective optical system 1 for an endoscope in consideration of a use state. The optical member PP is a member that assumes various filters, prisms, and/or the like. The various filters are, for example, a low-pass filter, an infrared cut filter, a filter that cuts a specific wavelength range, and the like. Each of the cover glass CG and the optical member PP is a member of which the incident surface and the emission surface are parallel to each other and which does not have focal power, and is not a lens. At least one of the cover glass CG or the optical member PP can also be omitted in the present disclosure. Further, an example in which an image plane Sim is positioned on the surface of the optical member PP facing the image side is shown in FIG. 1, but the position of the image plane Sim is not limited to this position in the present disclosure. The image plane Sim shown in FIG. 1 does not represent a size and represents the position thereof on the optical axis.

The objective optical system 1 for an endoscope according to this exemplary embodiment consists of a front group G1 and a rear group G2 that are arranged along the optical axis Z in order from the object side toward the image side.

The front group G1 consists of one negative lens L1, an optical path deflecting prism P1, an aperture stop St, and one positive lens L2 arranged along the optical path in order from the object side toward the image side. It is possible to obtain a wide angle of view required for an endoscope and to ensure a back focus by using the negative lens L1. Since a balance between positive focal power and negative focal power in the front group G1 can be adjusted by the positive lens L2, it is advantageous for suppressing astigmatism and field curvature. The aperture stop St shown in FIG. 1 does not necessarily represent a size or a shape and represents the position thereof on the optical axis Z.

Figure 2:
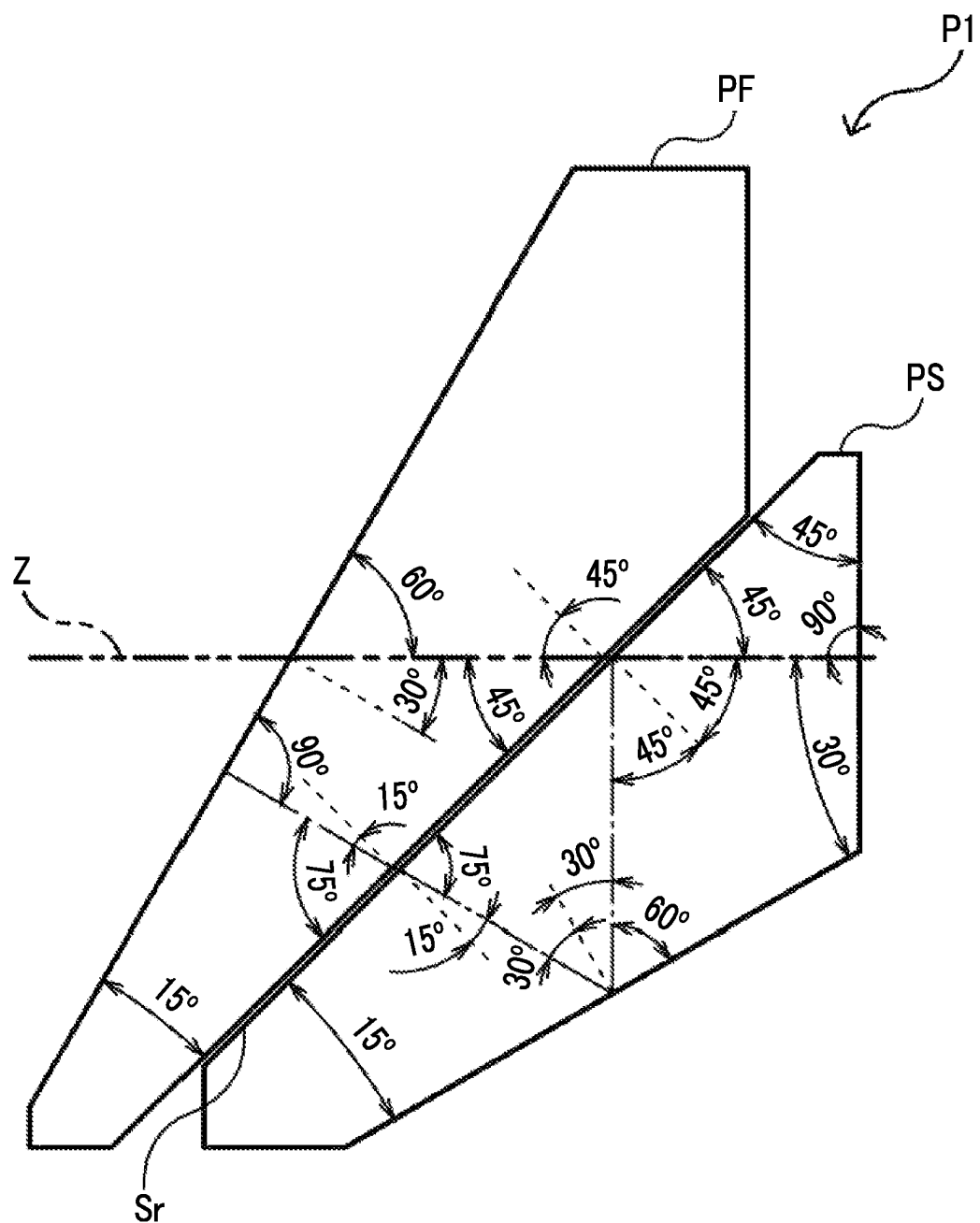
FIG. 2 is a diagram showing the configuration of an optical path deflecting prism P1.
Figure 3:
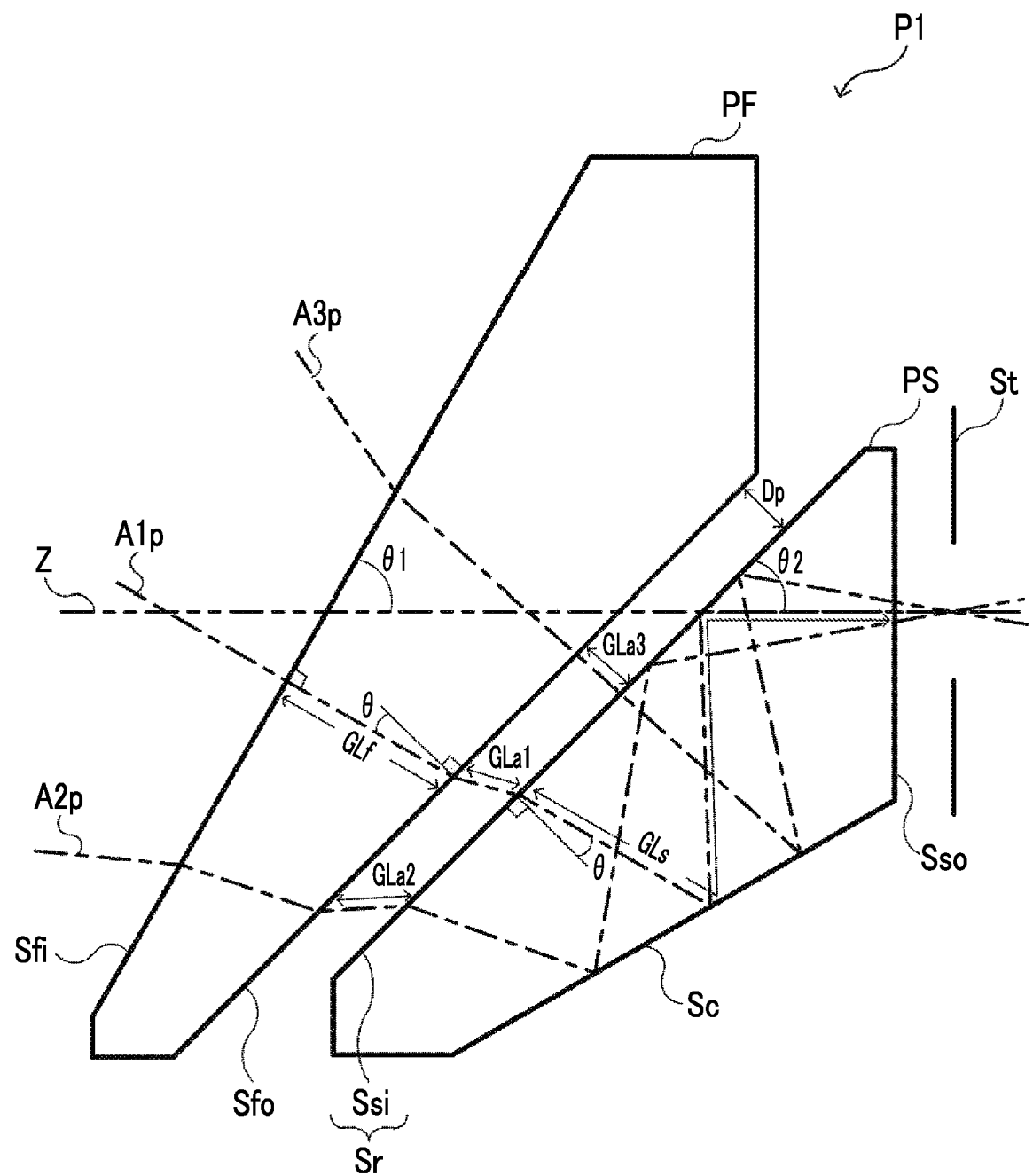
FIG. 3 is an enlarged schematic diagram of the optical path deflecting prism P1.

FIG. 2 shows an example of the configuration of the optical path deflecting prism P1 of the front group G1. FIG. 2 shows the angles of the respective surfaces of the optical path deflecting prism P1. It is preferable that the optical path deflecting prism P1 includes at least one surface Sr for bending an optical path by using total reflection as shown in FIG. 3 to be described in detail later. The optical path deflecting prism P1 of which the example is shown in FIG. 2 includes two prisms, that is, a first prism PF and a second prism PS and includes one surface Sr for bending an optical path by using total reflection. Since a turn-back optical path is formed in the optical path deflecting prism P1 by using total reflection as described above, it is advantageous for a reduction in size. The optical path deflecting prism P1 may include, for example, a surface coated with a film made of metal, such as aluminum, and/or a surface coated with a dielectric film as a reflecting surface in addition to the surface Sr for bending an optical path by using total reflection. Further, an example in which the optical path deflecting prism P1 consists of two prisms is shown in FIG. 2, but the number of prisms forming the optical path deflecting prism P1 is not particularly limited in this exemplary embodiment.

The rear group G2 includes a plurality of cemented lenses each of which has a configuration where positive and negative lenses are cemented to each other. Since the rear group G2 includes a plurality of cemented lenses, it is advantageous for correcting a lateral chromatic aberration. Each of the plurality of cemented lenses may be a cemented lens in which a positive lens and a negative lens are cemented to each other in order from the object side, or may be a cemented lens in which a negative lens and a positive lens are cemented to each other in order from the object side.

Specifically, it is preferable that the rear group G2 includes one cemented lens CE1 disposed on a side closest to the object side. Since the cemented lens is disposed closest to the object side in the rear group G2, it is advantageous for correcting a lateral chromatic aberration.

Further, it is preferable that the rear group G2 includes one cemented lens CE1 and a positive lens L4 arranged in order from a side closest to the object side toward the image side. Since a balance between positive focal power and negative focal power in the rear group G2 can be adjusted by the positive lens L4, it is advantageous for suppressing astigmatism and field curvature.

Furthermore, it is preferable that the rear group G2 consists of one cemented lens CE1, the positive lens L4, and one cemented lens CE2 arranged along the optical axis Z in order from the object side toward the image side. Due to the cemented lens CE2, it is more advantageous for correcting a lateral chromatic aberration.

In the rear group G2, the positive lens L4 may be replaced with a cemented lens CE3 as in the configuration of Example 8 to be described later. Even in this case, an effect of suppressing astigmatism and field curvature is obtained.

For example, the rear group G2 of the objective optical system 1 for an endoscope shown in FIG. 1 is adapted to consist of the cemented lens CE1, the positive lens L4, and the cemented lens CE2 arranged along the optical axis Z in order from the object side toward the image side. The cemented lens CE1 is formed of a positive lens L31 and a negative lens L32 cemented to each other, and the cemented lens CE2 is formed of a positive lens L51 and a negative lens L52 cemented to each other. The above-mentioned configuration related to the objective optical system 1 for an endoscope is referred to as a basic configuration.

It is preferable that the objective optical system 1 for an endoscope according to this exemplary embodiment is adapted to satisfy the following conditional expression (1) in a case where the Abbe number of the positive lens of the cemented lens closest to the object side with respect to a d line is denoted by vpa, the Abbe number of the negative lens of the cemented lens closest to the object side with respect to a d line is denoted by vna, the Abbe number of the positive lens of the cemented lens closest to the image side with respect to a d line is denoted by vpb, the Abbe number of the negative lens of the cemented lens closest to the image side with respect to a d line is denoted by vnb, a distance on the optical axis Z between the aperture stop St and the cemented surface of the cemented lens closest to the object side is denoted by Lca, a distance on the optical axis Z between the aperture stop St and the cemented surface of the cemented lens closest to the image side is denoted by Lcb, the curvature radius of the cemented surface of the cemented lens closest to the object side is denoted by Rca, the curvature radius of the cemented surface of the cemented lens closest to the image side is denoted by Rcb, the focal length of the entire system is denoted by f, and the focal length of the rear group G2 is denoted by fg. In a case where $$\left|(vna-vpa)\times\frac{Lca}{Rca}\right|\times\left|(vnb-vpb)\times\frac{Lcb}{Rcb}\right|\times\frac{f}{fg}$$

is made to be larger than the lower limit of Conditional expression (1), it is advantageous for correcting a lateral chromatic aberration. In a case where $$\left|(vna-vpa)\times\frac{Lca}{Rca}\right|\times\left|(vnb-vpb)\times\frac{Lcb}{Rcb}\right|\times\frac{f}{fg}$$

is made to be smaller than the upper limit of Conditional expression (1), an increase in the total length of a lens system is suppressed, so that it is advantageous for a reduction in size. In addition, in a case where the objective optical system 1 for an endoscope according to this exemplary embodiment is adapted to satisfy the following conditional expression (1-1), better characteristics can be obtained.

$$250<\left|(vna-vpa)\times\frac{Lca}{Rca}\right|\times\left|(vnb-vpb)\times\frac{Lcb}{Rcb}\right|\times\frac{f}{fg}<1000. \quad (1)$$

$$300<\left|(vna-vpa)\times\frac{Lca}{Rca}\right|\times\left|(vnb-vpb)\times\frac{Lcb}{Rcb}\right|\times\frac{f}{fg}<800. \quad (1\text{-}1)$$

In FIG. 1, for example, a distance on the optical axis between the aperture stop St and the cemented surface of the cemented lens CE1 closest to the object side is denoted by Lca and a distance on the optical axis between the aperture stop St and the cemented surface of the cemented lens CE2 closest to the image side is denoted by Lcb. Further, the curvature radius of the cemented surface of the cemented lens CE1 closest to the object side is denoted by Rca and the curvature radius of the cemented surface of the cemented lens CE2 closest to the image side is denoted by Rcb.

It is preferable that the objective optical system 1 for an endoscope according to this exemplary embodiment is adapted to satisfy the following conditional expression (2) in a case where the total number of the cemented lenses is denoted by k, a natural number in a range of 1 to k is denoted by i, the Abbe number of a positive lens of the i-th cemented lens from the object side with respect to a d line is denoted by vpi, the Abbe number of a negative lens of the i-th cemented lens from the object side with respect to a d line is denoted by vni, a distance on the optical axis Z between the aperture stop St and the cemented surface of the i-th cemented lens from the object side is denoted by Lci, the curvature radius of the cemented surface of the i-th cemented lens from the object side is denoted by Rci, the focal length of the front group G1 is denoted by ff, and the focal length of the rear group G2 is denoted by fg. In a case where $$\left(\sum_{i=1}^{k}\left|(vni-vpi)\times\frac{Lci}{Rci}\right|\right)\times\left|\frac{ff}{fg}\right|$$

is made to be larger than the lower limit of Conditional expression 2 it is advantageous for correcting a lateral chromatic aberration. In a case where $$\left(\sum_{i=1}^{k}\left|(vni-vpi)\times\frac{Lci}{Rci}\right|\right)\times\left|\frac{ff}{fg}\right|$$

is made to be smaller than the upper limit of Conditional expression (2), an increase in the total length of the lens system is suppressed, so that it is advantageous for a reduction in size. In addition, in a case where the objective optical system 1 for an endoscope according to this exemplary embodiment is adapted to satisfy the following conditional expression (2-1), better characteristics can be obtained.

$$300<\left(\sum_{i=1}^{k}\left|(vni-vpi)\times\frac{Lci}{Rci}\right|\right)\times\left|\frac{ff}{fg}\right|<2000 \quad (2)$$

$$500<\left(\sum_{i=1}^{k}\left|(vni-vpi)\times\frac{Lci}{Rci}\right|\right)\times\left|\frac{ff}{fg}\right|<1500 \quad (2\text{-}1)$$

Further, it is preferable that the objective optical system 1 for an endoscope according to this exemplary embodiment satisfies the following conditional expression (3) in a case where the back focus of the entire system at an equivalent air path is denoted by Bf and the focal length of the entire system is denoted by f. In a case where Bf/f is made to be larger than the lower limit of Conditional expression (3), the length of the back focus can be increased, so that it is advantageous for fixing an image pickup element. In a case where Bf/f is made to be smaller than the upper limit of Conditional expression (3), an increase in the total length of the lens system is suppressed, so that it is advantageous for a reduction in size. In a case where the objective optical system 1 for an endoscope according to this exemplary embodiment is adapted to satisfy Conditional expression (3-1), better characteristics can be obtained.

$$0.95 < Bf/f < 2 \quad (3)$$

$$1 < Bf/f < 1.8 \quad (3\text{-}1)$$

Furthermore, it is preferable that the objective optical system 1 for an endoscope according to this exemplary embodiment satisfies the following conditional expression (4) in a case where the curvature radius of a surface of the negative lens L1 of the front group G1 facing the image side is denoted by Rr1, the curvature radius of a surface of the negative lens L1 of the front group G1 facing the object side is denoted by Rf1, the focal length of the entire system is denoted by f, and the focal length of the negative lens L1 of the front group G1 is denoted by f1. (Rr1+Rf1)/(Rr1−Rf1) of Conditional expression (4) is a term related to the shape of the negative lens L1 of the front group G1. In a case where $$\frac{Rr1 + Rf1}{Rr1 - Rf1} \times \frac{f}{f1}$$

is made to be larger than the lower limit of Conditional expression (4), the refraction of an off-axis ray is suitably controlled. As a result, it is easy to suppress distortion. In a case where $$\frac{Rr1 + Rf1}{Rr1 - Rf1} \times \frac{f}{f1}$$

is made to be smaller than the upper limit of Conditional expression (4), it is advantageous for a reduction in size. In addition, in a case where the objective optical system 1 for an endoscope according to this exemplary embodiment is adapted to satisfy the following conditional expression (4-1), better characteristics can be obtained.

$$0.95 < \frac{Rr1 + Rf1}{Rr1 - Rf1} \times \frac{f}{f1} < 1.32 \quad (4)$$

$$1 < \frac{Rr1 + Rf1}{Rr1 - Rf1} \times \frac{f}{f1} < 1.28 \quad (4\text{-}1)$$

Moreover, it is preferable that the objective optical system 1 for an endoscope according to this exemplary embodiment satisfies the following conditional expression (5) in a case where the curvature radius of a surface of the negative lens L1 of the front group G1 facing the image side is denoted by Rr1, the curvature radius of a surface of the negative lens L1 of the front group G1 facing the object side is denoted by Rf1, and the refractive index of the negative lens L1 of the front group G1 with respect to a d line is denoted by Nd1. (Rr1+Rf1)/(Rr1−Rf1) of Conditional expression (5) is a term related to the shape of the negative lens L1 of the front group G1. In a case where $$\left(\frac{Rr1 + Rf1}{Rr1 - Rf1}\right) / Nd1$$

is made to be larger than the lower limit of Conditional expression (5), the refraction of an off-axis ray is suitably controlled. As a result, it is easy to suppress distortion. In a case where $$\left(\frac{Rr1 + Rf1}{Rr1 - Rf1}\right) / Nd1$$

is made to be smaller than the upper limit of Conditional expression (5), it is advantageous for a reduction in size. In addition, in a case where the objective optical system 1 for an endoscope according to this exemplary embodiment is adapted to satisfy the following conditional expression (5-1), better characteristics can be obtained.

$$-1.02 < \left(\frac{Rr1 + Rf1}{Rr1 - Rf1}\right) / Nd1 < -0.75 \quad (5)$$

$$-1 < \left(\frac{Rr1 + Rf1}{Rr1 - Rf1}\right) / Nd1 < -0.8 \quad (5\text{-}1)$$

Furthermore, it is preferable that the objective optical system 1 for an endoscope according to this exemplary embodiment satisfies the following conditional expression (6) in a case where a distance on the optical axis between the aperture stop St and a lens surface closest to the object side is denoted by Lf, the refractive index of the optical path deflecting prism P1 with respect to a d line is denoted by Ndp, and the focal length of the negative lens L1 of the front group GT is denoted by f1. In a case where the optical path deflecting prism P1 includes a plurality of prisms as shown in FIG. 2, Ndp is an average value of the refractive indexes of the plurality of prisms, which are included in the optical path deflecting prism P1, with respect to a d line. In a case where |Lf/(Ndp×f1)| is made to be larger than the lower limit of Conditional expression (6), it is advantageous for increasing the angle of an on-axis principal ray, which is to be incident on the front group GT, with respect to the optical axis Z, that is, an angle thereof in the oblique-viewing direction. In a case where |Lf/(Ndp×f1)| is made to be smaller than the upper limit of Conditional expression (6), it is advantageous for a reduction in size. In addition, in a case where the objective optical system 1 for an endoscope according to this exemplary embodiment is adapted to satisfy the following conditional expression (6-1), better characteristics can be obtained.

$$0.75 < |Lf/(Ndp \times f1)| < 1 \quad (6)$$

$$0.8 < |Lf/(Ndp \times f1)| < 0.951 \quad (6\text{-}1)$$

Two preferred configuration examples, which are made in consideration of the above-mentioned conditional expressions, and effects thereof will be described here. A first configuration example is an objective optical system for an endoscope that has the above-mentioned basic configuration and satisfies Conditional expression (1). According to the first configuration example, it is advantageous for correcting a lateral chromatic aberration and an increase in the total length of the lens system is suppressed, so that it is advantageous for a reduction in size.

A second configuration example is an objective optical system for an endoscope that has the above-mentioned basic configuration and satisfies Conditional expression (2). According to the second configuration example, it is advantageous for correcting a lateral chromatic aberration and an increase in the total length of the lens system is suppressed, so that it is advantageous for a reduction in size.

Second Exemplary Embodiment

Next, a second exemplary embodiment will be described in detail with reference to the drawings as another exemplary embodiment of the present disclosure. The configuration of an objective optical system 1 for an endoscope according to the second exemplary embodiment is shown in FIG. 1 as in the first exemplary embodiment. That is, the objective optical system 1 for an endoscope according to the second exemplary embodiment has the above-mentioned basic configuration. Hereinafter, the description of components, effects, and showing methods overlapping with those of the above-mentioned basic configuration will be partially omitted.

The objective optical system 1 for an endoscope according to this exemplary embodiment consists of a front group G1 and a rear group G2, which has positive focal power, arranged along an optical axis Z in order from the object side toward the image side. Since the rear group G2 has positive focal power, an image can be formed on the image plane Sim.

The front group G1 consists of one negative lens L1, an optical path deflecting prism P1, an aperture stop St, and one positive lens L2 arranged along the optical path in order from the object side toward the image side. It is possible to obtain a wide angle of view required for an endoscope and to ensure a back focus by using the negative lens L1.

The optical path deflecting prism P1 consists of a first prism PF and a second prism PS arranged along the optical path in order from the object side toward the image side, and the second prism PS is separated from the first prism PF with an air gap Dp therebetween. There can be provided an objective optical system for an oblique-viewing endoscope in which on-axis luminous flux from an object to the front group G1 is inclined with respect to the optical axis Z by the optical path deflecting prism P1 without being parallel to the optical axis Z. Further, a ray incident on the optical path deflecting prism P1 passes through the air gap Dp and the optical path of the ray is then bent by total reflection on an interface between the air gap Dp and the optical path deflecting prism P1. Since a turn-back optical path can be formed in the optical path deflecting prism P1 by using total reflection in the optical path deflecting prism P1, it is advantageous for a reduction in size.

Here, with reference to FIG. 3, the detailed configuration of the optical path deflecting prism P1 according to this exemplary embodiment will be described and an image plane tilt, which may occur in the optical path deflecting prism P1, will be described. FIG. 3 is a schematic diagram of the optical path deflecting prism P1, and an on-axis principal ray (that is, the central ray of on-axis luminous flux) Alp to be incident on the optical path deflecting prism P1 and principal rays A2p and A3p corresponding to the maximum angle of view are also shown in FIG. 3. Hereinafter, the upper side of the optical axis Z of the rear group G2 is defined as a positive side, the lower side of the optical axis Z of the rear group G2 is defined as the negative side, A2p denotes a principal ray corresponding to the maximum angle of view on the positive side, and A3p denotes a principal ray corresponding to the maximum angle of view on the negative side. In FIG. 3, the air gap Dp is shown to be exaggerated for the description of the principle of an image plane tilt. Further, the aperture stop St is also shown in FIG. 3, but the aperture stop St shown in FIG. 3 does not necessarily represent a size and a shape.

As shown in FIG. 3, an incident surface Sfi of the first prism PF and an incident surface Ssi of the second prism PS are flat surfaces. The incident surface Sfi of the first prism PF is inclined with respect to the optical axis Z of the rear group G2 by an angle θ1, and the incident surface Ssi of the second prism PS is inclined with respect to the optical axis Z of the rear group G2 by an angle θ2. An emission surface Sfo of the first prism PF and the incident surface Ssi of the second prism PS are parallel to each other. The incident surface Ssi of the second prism PS, which is an interface between the prism and the air gap Dp, is a surface Sr that bends an optical path using total reflection.

As shown in FIG. 3, a ray incident on the first prism PF from the incident surface Sfi is transmitted through the first prism PF, is emitted from the emission surface Sfo, passes through the air gap Dp, and is incident on the second prism PS from the incident surface Ssi. After that, the ray is reflected by a reflecting surface Sc provided with a coating, such as an aluminum film or a dielectric film, is totally reflected by the incident surface Ssi (that is, the surface Sr for bending an optical path using total reflection), and is emitted from an emission surface Sso of the second prism PS that faces the aperture stop St. That is, the ray incident on the optical path deflecting prism P1 is reflected twice in the second prism PS, so that the optical path is bent twice.

The on-axis principal ray Alp is incident on the incident surface Sfi of the first prism PF so as to be perpendicular to the incident surface Sfi. In a case where the angle θ1 and the angle θ2 are different from each other in this case, the on-axis principal ray Alp is incident on the incident surface Ssi of the second prism PS so as not to be perpendicular to the incident surface Ssi and is incident on the incident surface Ssi so as to be inclined with respect to a line perpendicular to the incident surface Ssi of the second prism PS. In a case where the angle of the on-axis principal ray Alp with respect to a line perpendicular to the incident surface Ssi of the second prism PS is θ, θ is expressed by the following equation. In other words, the angle θ can be said to be the inclination of the incident surface Ssi of the second prism PS with respect to the on-axis principal ray Alp and the inclination of the air gap Dp with respect to the on-axis principal ray Alp.

$$\theta = |\theta 1 - \theta 2|$$

The geometric lengths of the optical paths of the on-axis principal ray Alp, the principal ray A2p corresponding to the maximum angle of view on the positive side, and the principal ray A3p corresponding to the maximum angle of view on the negative side in the air gap Dp are denoted by GLa1, GLa2, and GLa3, respectively. As described above, the air gap Dp is inclined with respect to the on-axis principal ray Alp by an angle θ. Accordingly, as shown in FIG. 3, the lengths GLa2 and GLa3 are different from each other, and the principal ray A2p corresponding to the maximum angle of view on the positive side and the principal ray A3p corresponding to the maximum angle of view on the negative side are asymmetrical with each other. For this reason, an image plane tilt occurs. Further, as the air gap Dp is larger and as the angle θ is larger, a difference between GLa2 and GLa3 is larger. For this reason, an image plane tilt appears significantly.

It is preferable that the objective optical system 1 for an endoscope according to this exemplary embodiment satisfies the following conditional expression (7) in a case where the focal length of the entire system is denoted by f and an air gap between the first prism PF and the second prism PS is denoted by Dp. In a case where f/Dp is made to be larger than the lower limit of Conditional expression (7), the air gap Dp is not excessively large. Accordingly, the occurrence of an image plane tilt can be suppressed. In a case where f/Dp is made to be smaller than the upper limit of Conditional expression (7), the air gap Dp is not excessively small. Accordingly, interference fringes and ghosts, which may occur between the first prism PF and the second prism PS, can be suppressed. Further, in a case where the objective optical system 1 for an endoscope according to this exemplary embodiment is adapted to satisfy the following conditional expression (7-1), better characteristics can be obtained.

$$30 < f/Dp < 500 \qquad (7)$$

$$50 < f/Dp < 300 \qquad (7\text{-}1)$$

Furthermore, it is preferable that the objective optical system 1 for an endoscope according to this exemplary embodiment satisfies the following conditional expression (8) in a case where the absolute value of an angle between the incident surface Sfi of the first prism PF and the optical axis Z of the rear group G2 is denoted by θ1, the absolute value of an angle between the incident surface of the second prism PS and the optical axis Z of the rear group G2 is denoted by θ2, and the units of θ1 and θ2 are degrees. Conditional expression (8) is an expression related to the above-mentioned angle θ. In a case where |θ1−θ2| is made to be larger than the lower limit of Conditional expression (8), it is advantageous for increasing the angle of the on-axis principal ray Alp, which is incident on the front group G1, with respect to the optical axis Z, that is, the angle of an oblique-viewing direction. In a case where |θ1−θ2| is made to be smaller than the upper limit of Conditional expression (8), the inclination (that is, an angle θ) of the air gap Dp with respect to the on-axis principal ray Alp is not excessively large. Accordingly, the occurrence of an image plane tilt can be suppressed. Moreover, in a case where the objective optical system 1 for an endoscope according to this exemplary embodiment is adapted to satisfy the following conditional expression (8-1), better characteristics can be obtained.

$$5 < |θ1−θ2| < 45 \qquad (8)$$

$$7 < |θ1−θ2| < 30 \qquad (8\text{-}1)$$

Further, it is preferable that the objective optical system 1 for an endoscope according to this exemplary embodiment satisfies the following conditional expression (9) in a case where the air gap between the first prism PF and the second prism PS is denoted by Dp, the geometric length of the optical path of the on-axis principal ray Alp in the first prism PF is denoted by GLf, and the geometric length of the optical path of the on-axis principal ray Alp in the second prism PS is denoted by GLs. In a case where (GLf+GLs)/Dp is made to be larger than the lower limit of Conditional expression (9), the air gap Dp is not excessively large. Accordingly, the occurrence of an image plane tilt can be suppressed. In a case where (GLf+GLs)/Dp is made to be smaller than the upper limit of Conditional expression (9), the air gap Dp is not excessively small. Accordingly, interference fringes and ghosts, which may occur between the first prism PF and the second prism PS, can be suppressed. Furthermore, in a case where the objective optical system 1 for an endoscope according to this exemplary embodiment is adapted to satisfy the following conditional expression (9-1), better characteristics can be obtained.

$$60 < (GLf+GLs)/Dp < 600 \qquad (9)$$

$$100 < (GLf+GLs)/Dp < 500 \qquad (9\text{-}1)$$

Moreover, it is preferable that the objective optical system 1 for an endoscope according to this exemplary embodiment satisfies the following conditional expression (10) in a case where the geometric length of the optical path of the on-axis principal ray Alp in the first prism PF is denoted by GLf, the geometric length of the optical path of the on-axis principal ray Alp in the second prism PS is denoted by GLs, and an average value of the refractive indexes of the first prism PF and the second prism PS with respect to a d line is denoted by Ndp. In a case where (GLs/GLf)/Ndp is made to be larger than the lower limit of Conditional expression (10), it is advantageous for ensuring a region of the second prism PS in which the ray is reflected. As a result, the overlap of rays is avoided. In a case where (GLs/GLf)/Ndp is made to be smaller than the upper limit of Conditional expression (10), the occurrence of an image plane tilt can be suppressed. In addition, in a case where the objective optical system 1 for an endoscope according to this exemplary embodiment is adapted to satisfy the following conditional expression (10-1), better characteristics can be obtained.

$$1 < (GLs/GLf)/Ndp < 2.5 \qquad (10)$$

$$2 < (GLs/GLf)/Ndp < 2.2 \qquad (10\text{-}1)$$

Further, it is preferable that the objective optical system 1 for an endoscope according to this exemplary embodiment satisfies the following conditional expression (11) in a case where the maximum total angle of view of the objective optical system 1 for an endoscope is denoted by 2ω, an average value of the refractive indexes of the first prism PF and the second prism PS with respect to a d line is denoted by Ndp, the absolute value of an angle between the incident surface Sfi of the first prism PF and the optical axis Z of the rear group G2 is denoted by θ1, the absolute value of an angle between the incident surface Ssi of the second prism PS and the optical axis Z of the rear group G2 is denoted by θ2, and the units of 2ω, θ1, and θ2 are degrees. In a case where (2ω×Ndp)/|θ1−θ2| is made to be larger than the lower limit of Conditional expression (11), it is advantageous for increasing an angle of view. In a case where (2ω×Ndp)/|θ1−θ2| is made to be smaller than the upper limit of Conditional expression (11), a ray can be emitted toward the rear group G2 while an optical path is bent in the second prism PS by total reflection. In a case where (2ω×Ndp)/|θ1−θ2| is made to be equal to or larger than the upper limit of Conditional expression (11), it may not be possible to totally reflect the ray and to emit the ray toward the rear group G2. Furthermore, in a case where the objective optical system 1 for an endoscope according to this exemplary embodiment is adapted to satisfy the following conditional expression (11-1), better characteristics can be obtained.

$$8.8 < (2ω×Ndp)/|θ1−θ2| < 25 \qquad (11)$$

$$9 < (2ω×Ndp)/|θ1−θ2| < 22 \qquad (11\text{-}1)$$

Since preferred configurations and possible configurations according to the above-mentioned first and second exemplary embodiments, which include the configurations related to the conditional expression, can be combined in any form, it is preferable that the configurations are appropriately and selectively employed according to the required specifications.

Next, numerical examples of the objective optical systems 1 for an endoscope according to the first and/or second exemplary embodiments of the present disclosure will be described. All of the data of each example to be described below are data in a case where the focal length of the objective optical system 1 for an endoscope is standardized to be 1.00. Further, reference numerals given to lenses in the cross-sectional views of the respective examples will be independently used for each example in order to avoid the complication of description and drawings caused by an increase in the number of digits of each reference numeral. Accordingly, even though common reference numerals are given to components in the drawings of different examples, the components are not necessarily common.

EXAMPLE 1

Figure 4:
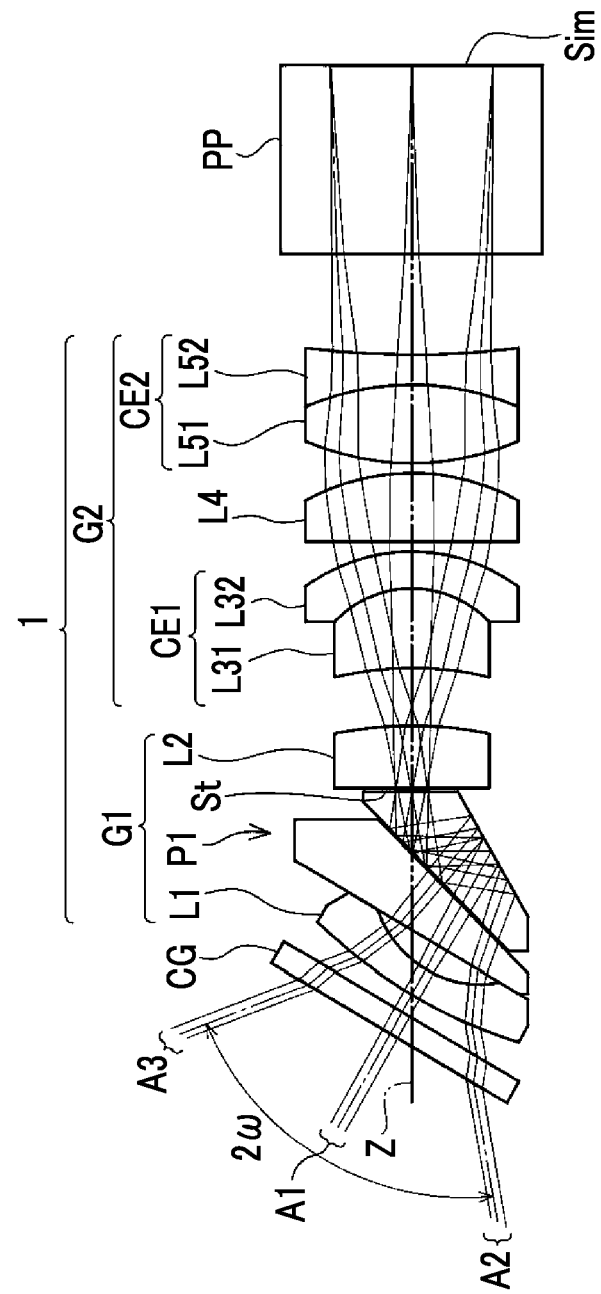
FIG. 4 is a cross-sectional view showing the configuration and luminous flux of an objective optical system for an endoscope of Example 1.

A cross-sectional view showing the configuration and luminous flux of an objective optical system 1 for an endoscope of Example 1 is shown in FIG. 4. In FIG. 4, on-axis luminous flux A1 and luminous flux A2 and luminous flux A3 corresponding to the maximum angle of view are shown as luminous flux and the maximum total angle $2\omega$ of view is also shown. Further, in FIG. 4, a cover glass CG and an optical member PP are also shown together as in FIG. 1 in consideration of a use state. Since the configuration of a front group G1 of the objective optical system 1 for an endoscope of Example 1 is the same as described above, the repeated description thereof will be omitted here. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a positive lens L51 and a negative lens L52 cemented to each other.

The basic lens data of the objective optical system 1 for an endoscope of Example 1 are shown in Table 1, and the specifications thereof are shown in Table 2. In Table 1, surface numbers, which are obtained in a case where a surface closest to the object side is set as a first surface and a number is increased toward the image side one by one, are shown in the column of Sn, the curvature radii of the respective surfaces are shown in the column of R, and a surface spacing between each surface and a surface adjacent to the image side thereof is shown in the column of D. Further, the refractive indexes of the respective components with respect to a d line are shown in the column of Nd, and the Abbe numbers of the respective components with respect to a d line are shown in the column of vd.

In Table 1, the sign of the curvature radius of a surface having a convex shape toward the object side is set to be positive and the sign of the curvature radius of a surface having a convex shape toward the image side is set to be negative. In Table 1, a cover glass CG, an optical path deflecting prism P1, an aperture stop St, and an optical member PP are shown together. In Table 1, a surface number and the expression of (St) are written in the space of the surface number of a surface corresponding to the aperture stop St. A value written in the lowest space of the column of D in Table 1 is a spacing between a surface, which is closest to the image side in Table 1, and the image plane Sim.

The value of the focal length f of the entire system and the values of the back focus Bf, the F-Number FNo., and the maximum total angle $2\omega$ of view of the entire system at an equivalent air path are shown in Table 2 with respect to a d line. (°) shown in the space of $2\omega$ means that a unit is a degree. Further, numerical values, which are rounded off to a predetermined place, are written in each table to be described below.

TABLE 1

| | | Example 1 | | |
|---|---|---|---|---|
| Sn | R | D | Nd | vd |
| 1 | ∞ | 0.2048 | 1.76800 | 71.70 |
| 2 | ∞ | 0.1638 | | |
| 3 | 4.2709 | 0.2375 | 1.88299 | 40.78 |
| 4 | 0.9212 | 0.2211 | | |
| 5 | ∞ | 0.3907 | 2.00100 | 29.13 |
| 6 | ∞ | 0.0136 | | |
| 7 | ∞ | 0.4916 | 2.00100 | 29.13 |
| 8 | ∞ | 0.6731 | 2.00100 | 29.13 |
| 9 | ∞ | 0.4918 | 2.00100 | 29.13 |
| 10(St) | ∞ | 0.0287 | | |
| 11 | ∞ | 0.5160 | 2.05090 | 26.94 |
| 12 | −3.3231 | 0.4750 | | |
| 13 | −2.8708 | 0.6552 | 1.62299 | 58.16 |
| 14 | −0.9212 | 0.3030 | 1.88299 | 40.78 |
| 15 | −1.5565 | 0.0819 | | |
| 16 | ∞ | 0.5651 | 1.43875 | 94.66 |
| 17 | −1.8988 | 0.0819 | | |
| 18 | 2.3406 | 0.6470 | 1.69400 | 56.29 |
| 19 | −2.3406 | 0.2457 | 2.05090 | 26.94 |
| 20 | 7.4399 | 0.8230 | | |
| 21 | ∞ | 1.5562 | 1.88299 | 40.78 |
| 22 | ∞ | 0.0000 | | |

TABLE 2

| Example 1 | |
|---|---|
| f | 1.00 |
| Bf | 1.62 |
| FNo. | 6.70 |
| 2ω(°) | 79.4 |

Figure 5:
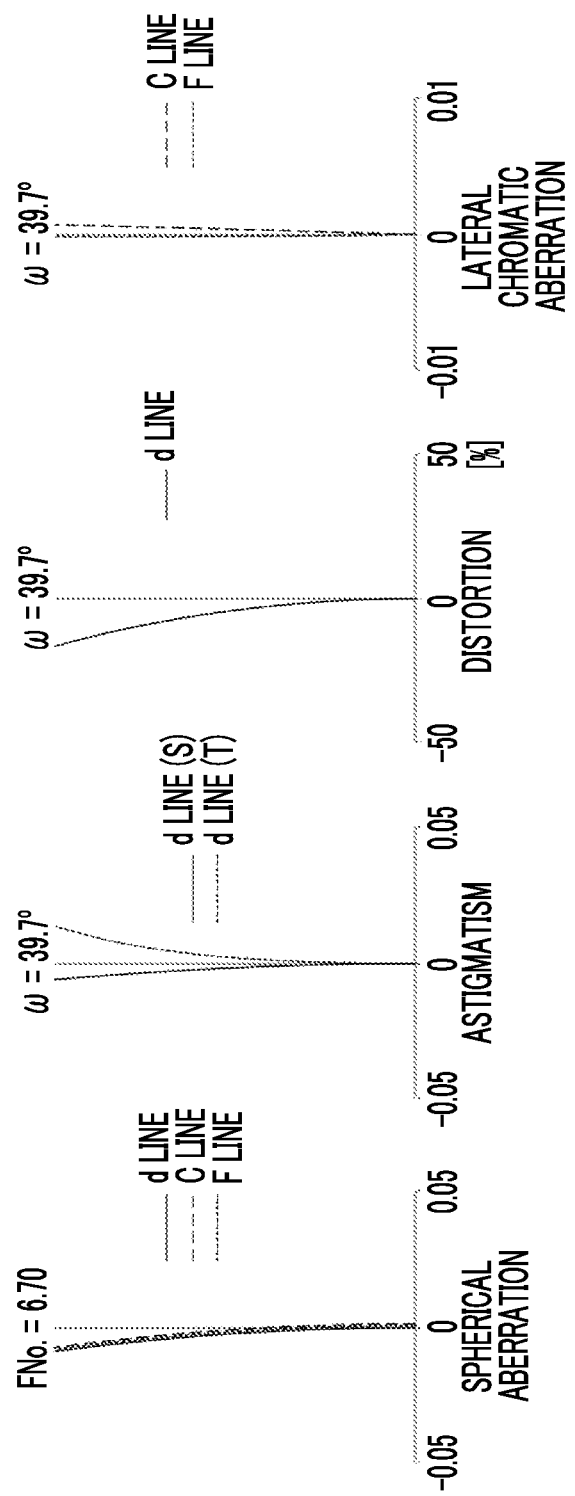
FIG. 5 is a diagram showing the respective aberrations of the objective optical system for an endoscope of Example 1.

A diagram showing the respective aberrations of the objective optical system 1 for an endoscope of Example 1 is shown in FIG. 5. A spherical aberration, astigmatism, distortion, and a lateral chromatic aberration are shown in FIG. 5 in order from the left. In the diagram showing the spherical aberration, aberrations with respect to a d line, a C line, and an F line are shown by a solid line, a long-dashed line, and a short-dashed line, respectively. In the diagram showing the astigmatism, an aberration in a sagittal direction with respect to a d line is shown by a solid line and an aberration in a tangential direction with respect to a d line is shown by a short-dashed line. In the diagram showing the distortion, an aberration with respect to a d line is shown by a solid line. In the diagram showing the lateral chromatic aberration, aberrations with respect to a C line and an F line are shown by a long-dashed line and a short-dashed line, respectively. FNo. in the diagram showing the spherical aberration means an F-Number and ω in the diagrams showing the other aberrations means the half angle of view. Data shown in Tables 1 and 5 are data in a case where a distance between an object and a surface of the cover glass CG facing the object side is set to 36.9.

Since the symbols, meanings, writing methods, and showing methods for the respective data about Example 1 are the same as those of other examples to be described below unless otherwise specified, the repeated description thereof will be omitted below.

EXAMPLE 2

Figure 6:
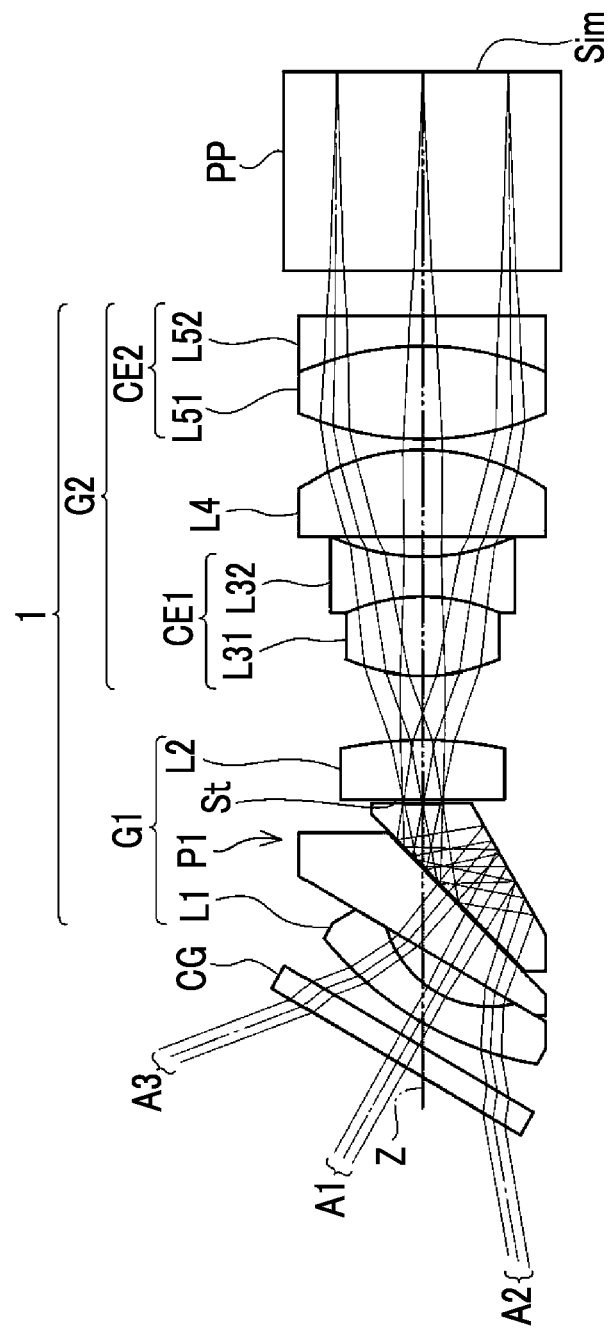
FIG. 6 is a cross-sectional view showing the configuration and luminous flux of an objective optical system for an endoscope of Example 2.

A cross-sectional view showing the configuration and luminous flux of an objective optical system 1 for an endoscope of Example 2 is shown in FIG. 6. Since the configuration of a front group G1 of the objective optical system 1 for an endoscope of Example 2 is the same as described above, the repeated description thereof will be omitted here. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a positive lens L51 and a negative lens L52 cemented to each other.

Figure 7:
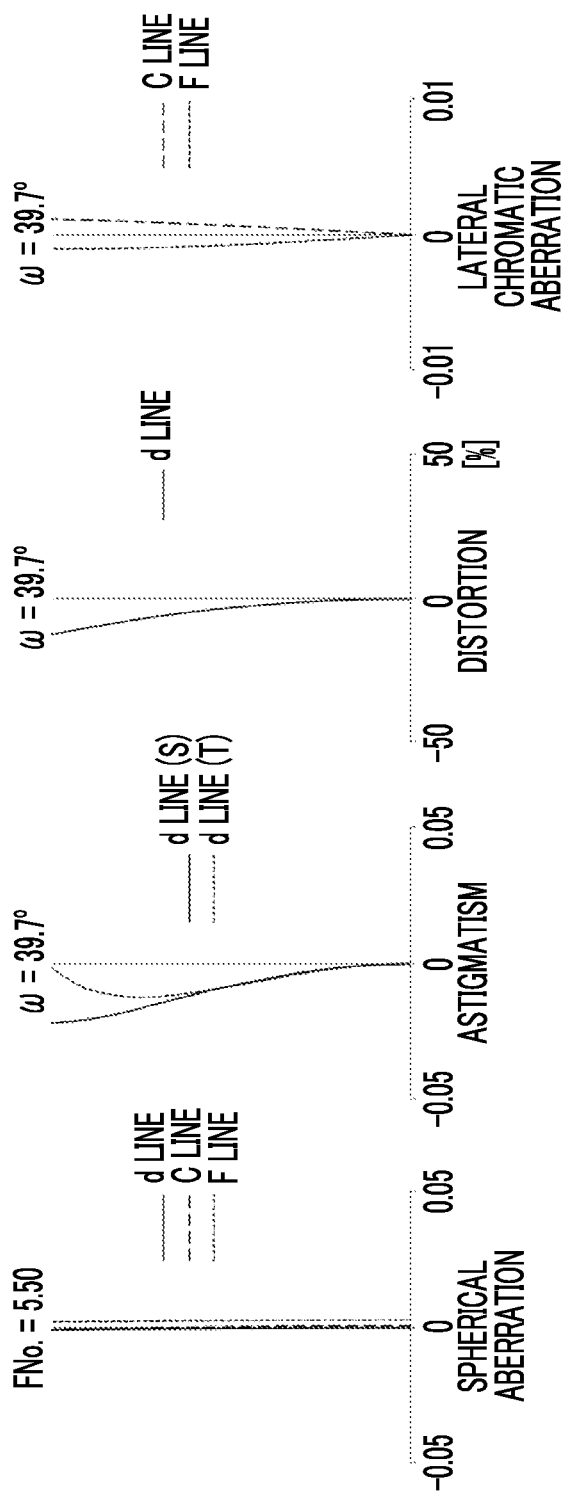
FIG. 7 is a diagram showing the respective aberrations of the objective optical system for an endoscope of Example 2.

The basic lens data of the objective optical system 1 for an endoscope of Example 2 are shown in Table 3, the specifications thereof are shown in Table 4, and a diagram showing the respective aberrations thereof is shown in FIG. 7. These data are data in a case where a distance between an object and a surface of the cover glass CG facing the object side is set to 38.6.

TABLE 3

Example 2

| Sn | R | D | Nd | vd |
|---|---|---|---|---|
| 1 | ∞ | 0.2147 | 1.76800 | 71.70 |
| 2 | ∞ | 0.1717 | | |
| 3 | 2.9606 | 0.2748 | 1.90043 | 37.37 |
| 4 | 0.9059 | 0.2490 | | |
| 5 | ∞ | 0.4096 | 2.00100 | 29.13 |
| 6 | ∞ | 0.0142 | | |
| 7 | ∞ | 0.5162 | 2.00100 | 29.13 |
| 8 | ∞ | 0.7051 | 2.00100 | 29.13 |
| 9 | ∞ | 0.5152 | 2.00100 | 29.13 |
| 10(St) | ∞ | 0.0301 | | |
| 11 | ∞ | 0.4894 | 2.00069 | 25.46 |
| 12 | −3.3461 | 0.5238 | | |
| 13 | 1.6323 | 0.6440 | 1.51680 | 64.20 |
| 14 | −1.6323 | 0.3263 | 1.67300 | 38.26 |
| 15 | 1.9139 | 0.1631 | | |
| 16 | ∞ | 0.7127 | 1.72916 | 54.68 |
| 17 | −1.8272 | 0.0859 | | |
| 18 | 2.6042 | 0.7642 | 1.77200 | 49.98 |
| 19 | −2.6042 | 0.2490 | 1.89286 | 20.36 |
| 20 | ∞ | 0.3664 | | |
| 21 | ∞ | 1.6314 | 2.00100 | 29.13 |
| 22 | ∞ | 0.0000 | | |

TABLE 4

Example 2

| | |
|---|---|
| f | 1.00 |
| Bf | 1.16 |
| FNo. | 5.50 |
| 2ω(°) | 79.4 |

EXAMPLE 2A

Figure 8:
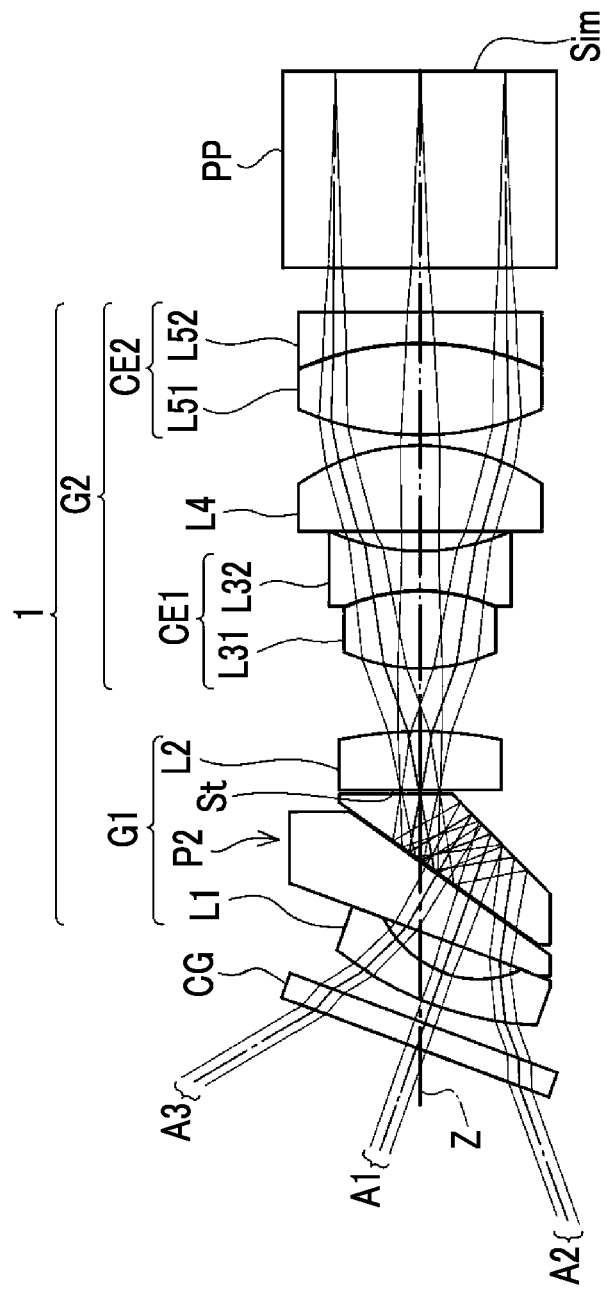
FIG. 8 is a cross-sectional view showing the configuration and luminous flux of an objective optical system for an endoscope of Example 2A.
Figure 9:
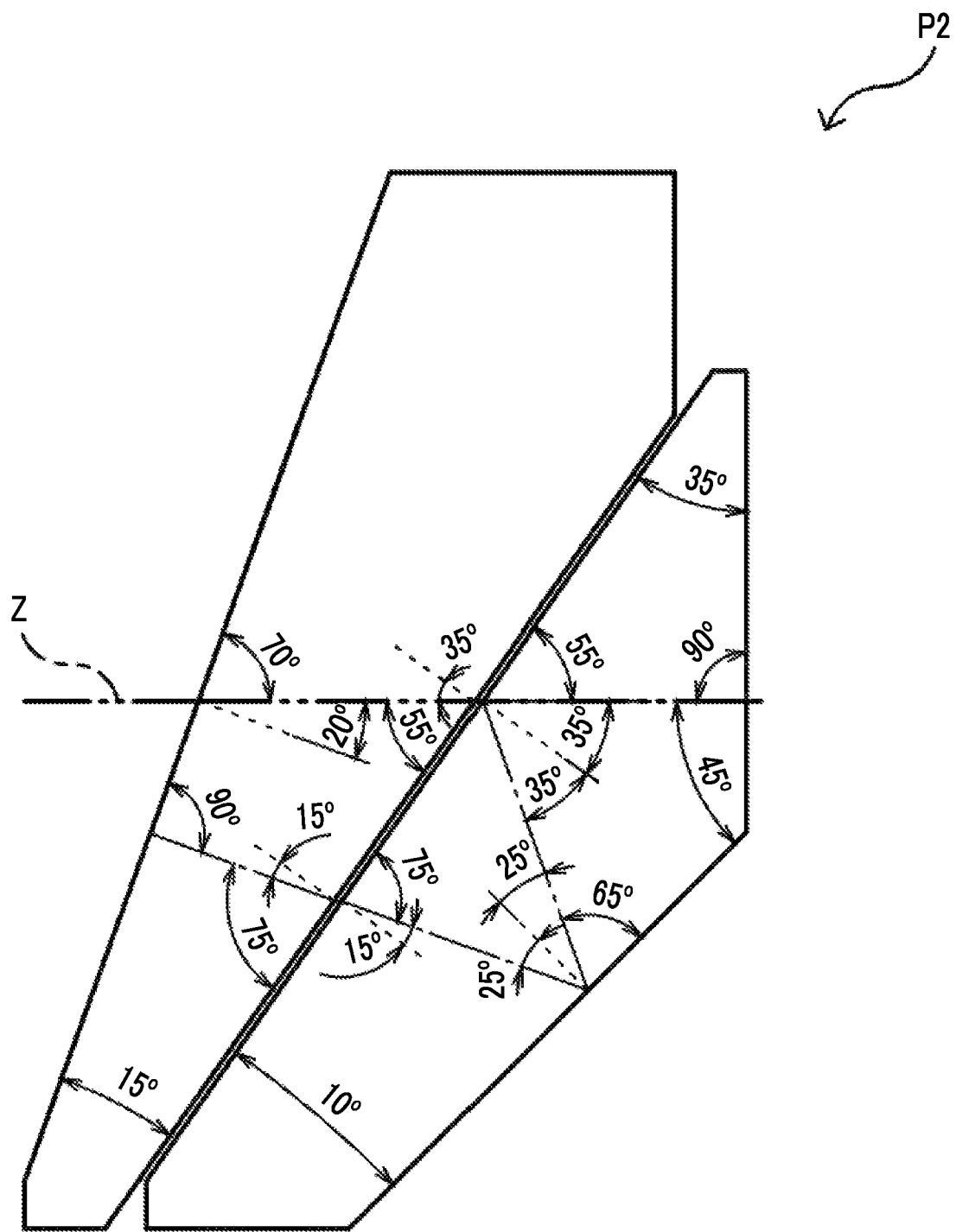
FIG. 9 is a diagram showing the configuration of an optical path deflecting prism P2.

A cross-sectional view showing the configuration and luminous flux of an objective optical system 1 for an endoscope of Example 2A as a modification example of Example 2 is shown in FIG. 8. In Example 2A, the optical path deflecting prism P1 of Example 2 is replaced with an optical path deflecting prism P2 shown in FIG. 9. Since the configuration of the objective optical system 1 for an endoscope of Example 2A other than replaced portion is the same as that of Example 2, the repeated description thereof will be omitted here.

The basic lens data of the objective optical system 1 for an endoscope of Example 2A are shown in Table 5 and the specifications thereof are shown in Table 6. A diagram showing the respective aberrations of the objective optical system 1 for an endoscope of Example 2A is the same as that of Example 2 shown in FIG. 7. These data are data in a case where a distance between an object and a surface of the cover glass CG facing the object side is set to 38.6.

TABLE 5

Example 2A

| Sn | R | D | Nd | vd |
|---|---|---|---|---|
| 1 | ∞ | 0.2147 | 1.76800 | 71.70 |
| 2 | ∞ | 0.1717 | | |
| 3 | 2.9606 | 0.2748 | 1.90043 | 37.37 |
| 4 | 0.9059 | 0.2490 | | |
| 5 | ∞ | 0.4096 | 2.00100 | 29.13 |
| 6 | ∞ | 0.0142 | | |
| 7 | ∞ | 0.5445 | 2.00100 | 29.13 |
| 8 | ∞ | 0.6420 | 2.00100 | 29.13 |
| 9 | ∞ | 0.5500 | 2.00100 | 29.13 |
| 10(St) | ∞ | 0.0301 | | |
| 11 | ∞ | 0.4894 | 2.00069 | 25.46 |
| 12 | −3.3461 | 0.5238 | | |
| 13 | 1.6323 | 0.6440 | 1.51680 | 64.20 |
| 14 | −1.6323 | 0.3263 | 1.67300 | 38.26 |
| 15 | 1.9139 | 0.1631 | | |
| 16 | ∞ | 0.7127 | 1.72916 | 54.68 |
| 17 | −1.8272 | 0.0859 | | |
| 18 | 2.6042 | 0.7642 | 1.77200 | 49.98 |
| 19 | −2.6042 | 0.2490 | 1.89286 | 20.36 |
| 20 | ∞ | 0.3664 | | |
| 21 | ∞ | 1.6314 | 2.00100 | 29.13 |
| 22 | ∞ | 0.0000 | | |

TABLE 6

Example 2A

| | |
|---|---|
| f | 1.00 |
| Bf | 1.16 |
| FNo. | 5.50 |
| 2ω(°) | 79.4 |

EXAMPLE 3

Figure 10:
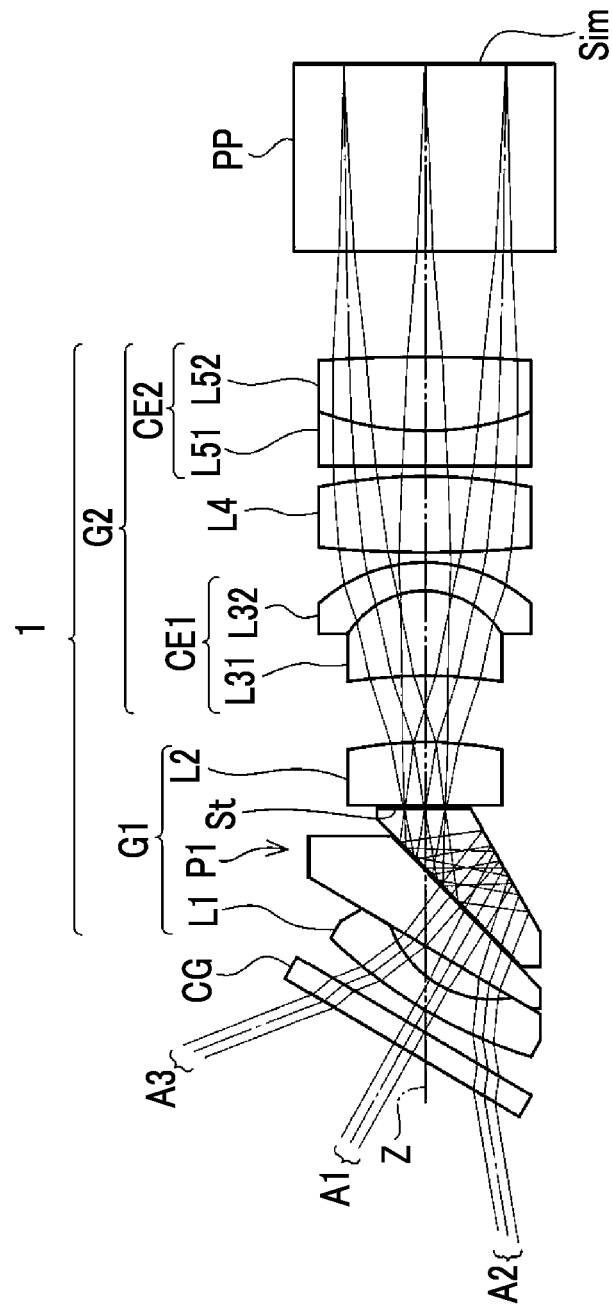
FIG. 10 is a cross-sectional view showing the configuration and luminous flux of an objective optical system for an endoscope of Example 3.

A cross-sectional view showing the configuration and luminous flux of an objective optical system 1 for an endoscope of Example 3 is shown in FIG. 10. Since the configuration of a front group G1 of the objective optical system 1 for an endoscope of Example 3 is the same as described above, the repeated description thereof will be omitted here. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a negative lens L51 and a positive lens L52 cemented to each other.

Figure 11:
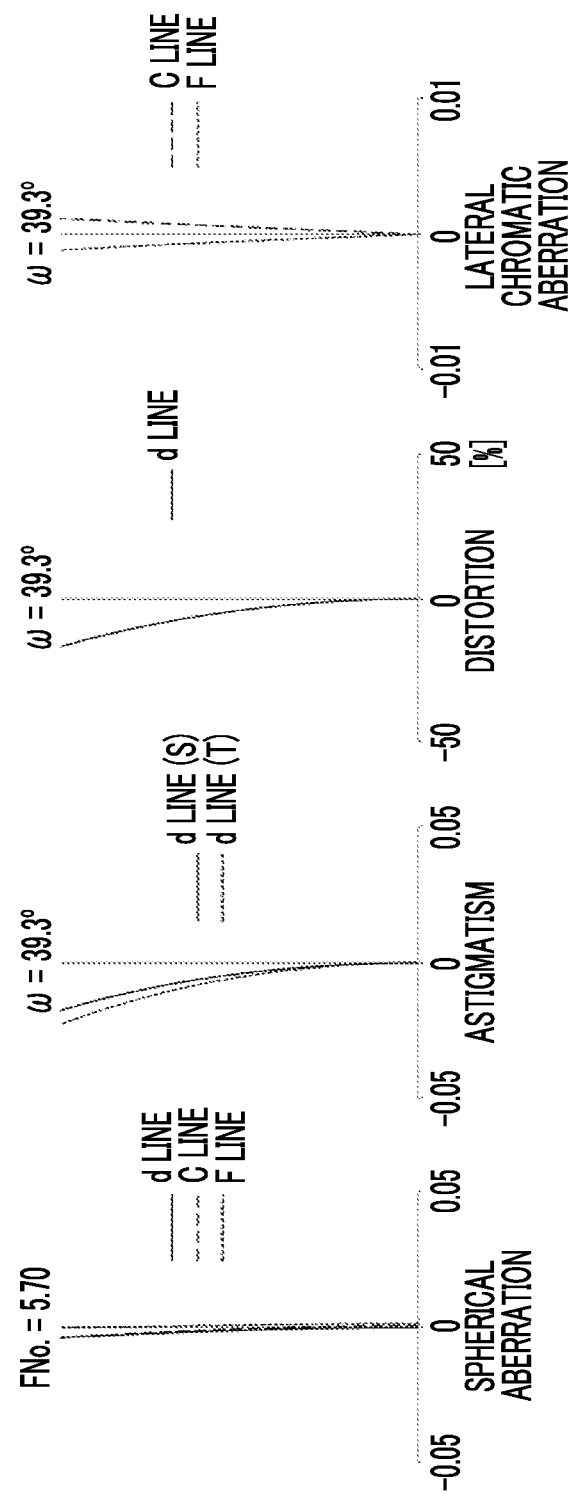
FIG. 11 is a diagram showing the respective aberrations of the objective optical system for an endoscope of Example 3.

The basic lens data of the objective optical system 1 for an endoscope of Example 3 are shown in Table 7, the specifications thereof are shown in Table 8, and a diagram showing the respective aberrations thereof is shown in FIG. 11. These data are data in a case where a distance between an object and a surface of the cover glass CG facing the object side is set to 36.3.

TABLE 7

Example 3

| Sn | R | D | Nd | vd |
|---|---|---|---|---|
| 1 | ∞ | 0.2018 | 1.76800 | 71.70 |
| 2 | ∞ | 0.1614 | | |
| 3 | 4.2121 | 0.2341 | 1.90043 | 37.37 |
| 4 | 0.9080 | 0.2187 | | |
| 5 | ∞ | 0.3850 | 2.05090 | 26.94 |
| 6 | ∞ | 0.0134 | | |
| 7 | ∞ | 0.4852 | 2.05090 | 26.94 |
| 8 | ∞ | 0.6628 | 2.05090 | 26.94 |
| 9 | ∞ | 0.4842 | 2.05090 | 26.94 |
| 10(St) | ∞ | 0.0282 | | |
| 11 | ∞ | 0.5165 | 2.10420 | 17.02 |
| 12 | −3.2759 | 0.5440 | | |
| 13 | −4.3880 | 0.6860 | 1.62299 | 58.16 |
| 14 | −0.7691 | 0.2340 | 1.89286 | 20.36 |
| 15 | −1.3405 | 0.0807 | | |
| 16 | 9.7050 | 0.6215 | 1.48749 | 70.24 |
| 17 | −4.4970 | 0.0807 | | |
| 18 | −817.1592 | 0.2904 | 1.62004 | 36.26 |
| 19 | 2.5754 | 0.6051 | 1.75500 | 52.32 |
| 20 | −13.4127 | 0.8639 | | |
| 21 | ∞ | 1.5334 | 2.00100 | 29.13 |
| 22 | ∞ | 0.0000 | | |

TABLE 8

Example 3

| f | 1.00 |
|---|---|
| Bf | 1.60 |
| FNo. | 5.70 |
| 2ω(°) | 78.6 |

EXAMPLE 3A

Figure 12:
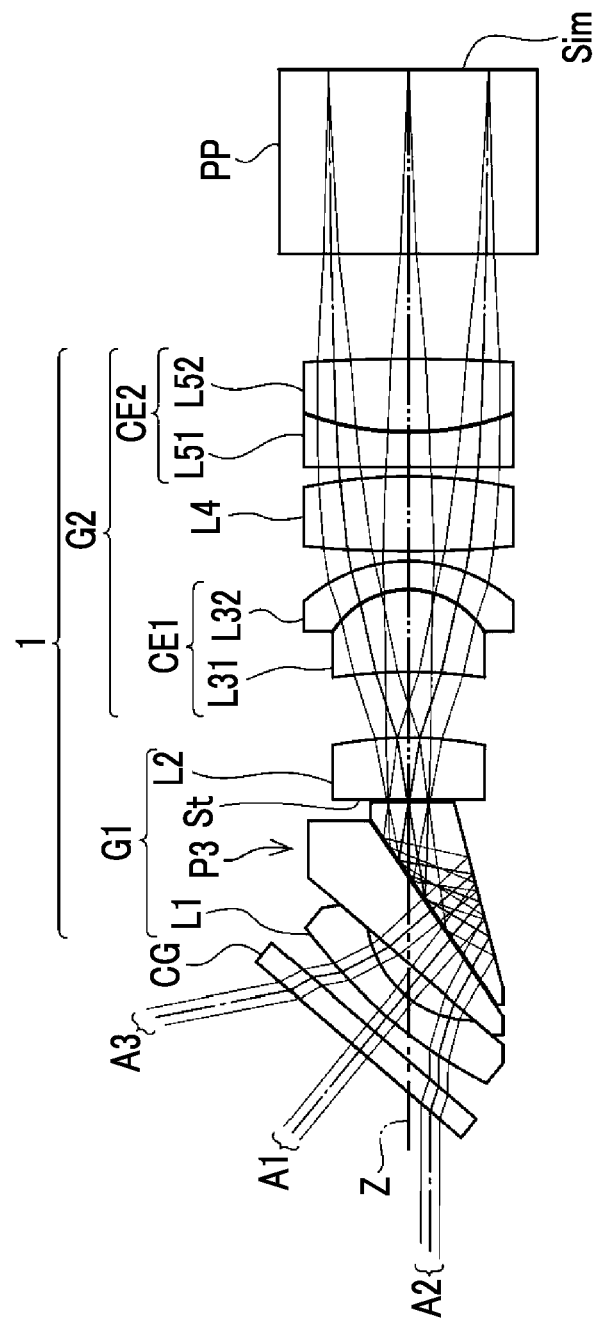
FIG. 12 is a cross-sectional view showing the configuration and luminous flux of an objective optical system for an endoscope of Example 3A.
Figure 13:
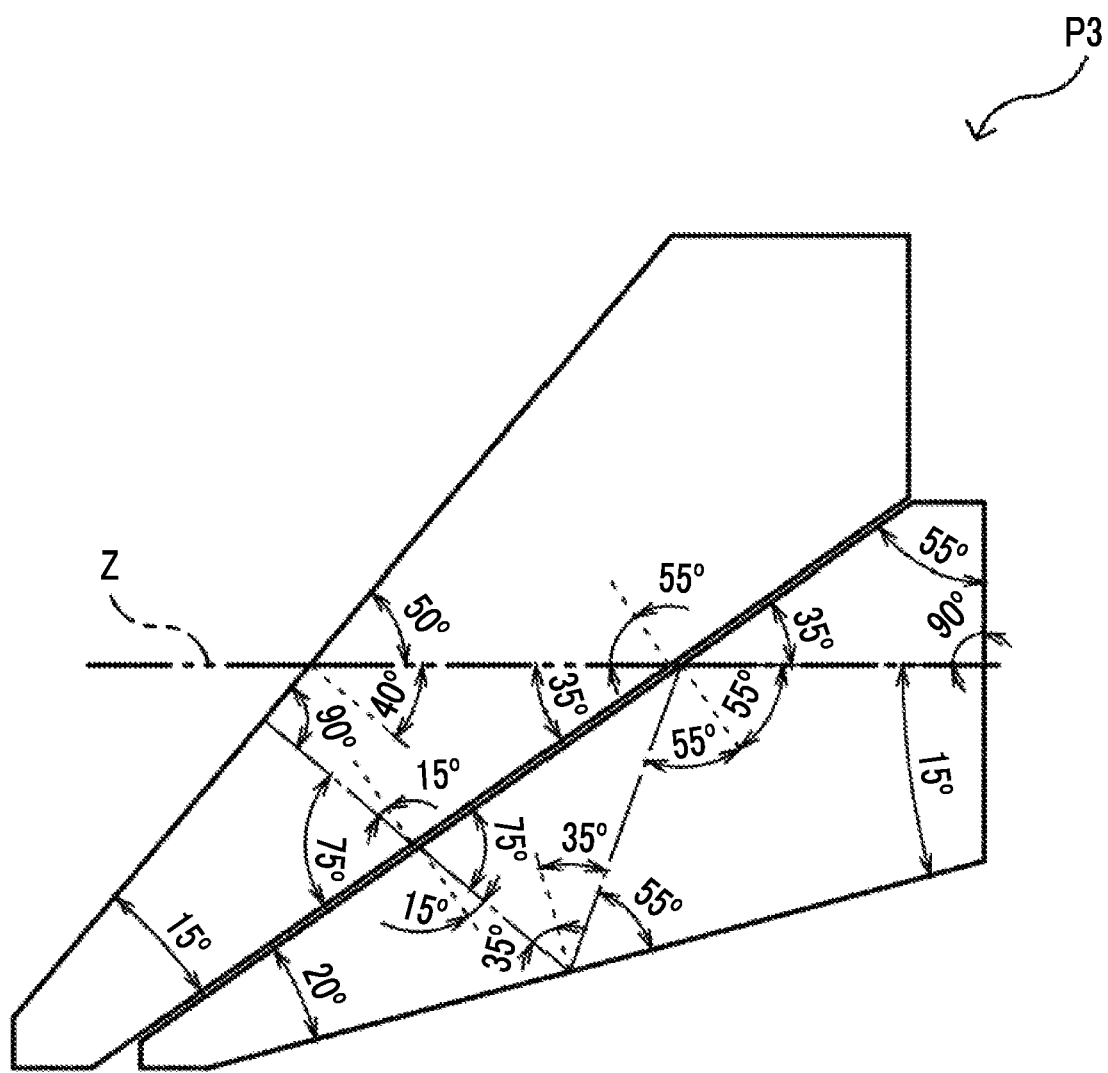
FIG. 13 is a diagram showing the configuration of an optical path deflecting prism P3.

A cross-sectional view showing the configuration and luminous flux of an objective optical system 1 for an endoscope of Example 3A as a modification example of Example 3 is shown in FIG. 12. In Example 3A, the optical path deflecting prism P1 of Example 3 is replaced with an optical path deflecting prism P3 shown in FIG. 13. Since the configuration of the objective optical system 1 for an endoscope of Example 3A other than replaced portion is the same as that of Example 3, the repeated description thereof will be omitted here.

The basic lens data of the objective optical system 1 for an endoscope of Example 3A are shown in Table 9 and the specifications thereof are shown in Table 10. A diagram showing the respective aberrations of the objective optical system 1 for an endoscope of Example 3A is the same as that of Example 3 shown in FIG. 11. These data are data in a case where a distance between an object and a surface of the cover glass CG facing the object side is set to 36.3.

TABLE 9

Example 3A

| Sn | R | D | Nd | vd |
|---|---|---|---|---|
| 1 | ∞ | 0.2018 | 1.76800 | 71.70 |
| 2 | ∞ | 0.1614 | | |
| 3 | 4.2121 | 0.2341 | 1.90043 | 37.37 |
| 4 | 0.9080 | 0.2187 | | |
| 5 | ∞ | 0.3850 | 2.05090 | 26.94 |
| 6 | ∞ | 0.0134 | | |
| 7 | ∞ | 0.3846 | 2.05090 | 26.94 |
| 8 | ∞ | 0.6476 | 2.05090 | 26.94 |
| 9 | ∞ | 0.6000 | 2.05090 | 26.94 |
| 10(St) | ∞ | 0.0282 | | |
| 11 | ∞ | 0.5165 | 2.10420 | 17.02 |
| 12 | −3.2759 | 0.5440 | | |
| 13 | −4.3880 | 0.6860 | 1.62299 | 58.16 |
| 14 | −0.7691 | 0.2340 | 1.89286 | 20.36 |
| 15 | −1.3405 | 0.0807 | | |
| 16 | 9.7050 | 0.6215 | 1.48749 | 70.24 |
| 17 | −4.4970 | 0.0807 | | |
| 18 | −817.1592 | 0.2904 | 1.62004 | 36.26 |
| 19 | 2.5754 | 0.6051 | 1.75500 | 52.32 |
| 20 | −13.4127 | 0.8639 | | |
| 21 | ∞ | 1.5334 | 2.00100 | 29.13 |
| 22 | ∞ | 0.0000 | | |

TABLE 10

Example 3A

| f | 1.00 |
|---|---|
| Bf | 1.60 |
| FNo. | 5.70 |
| 2ω(°) | 78.6 |

EXAMPLE 4

Figure 14:
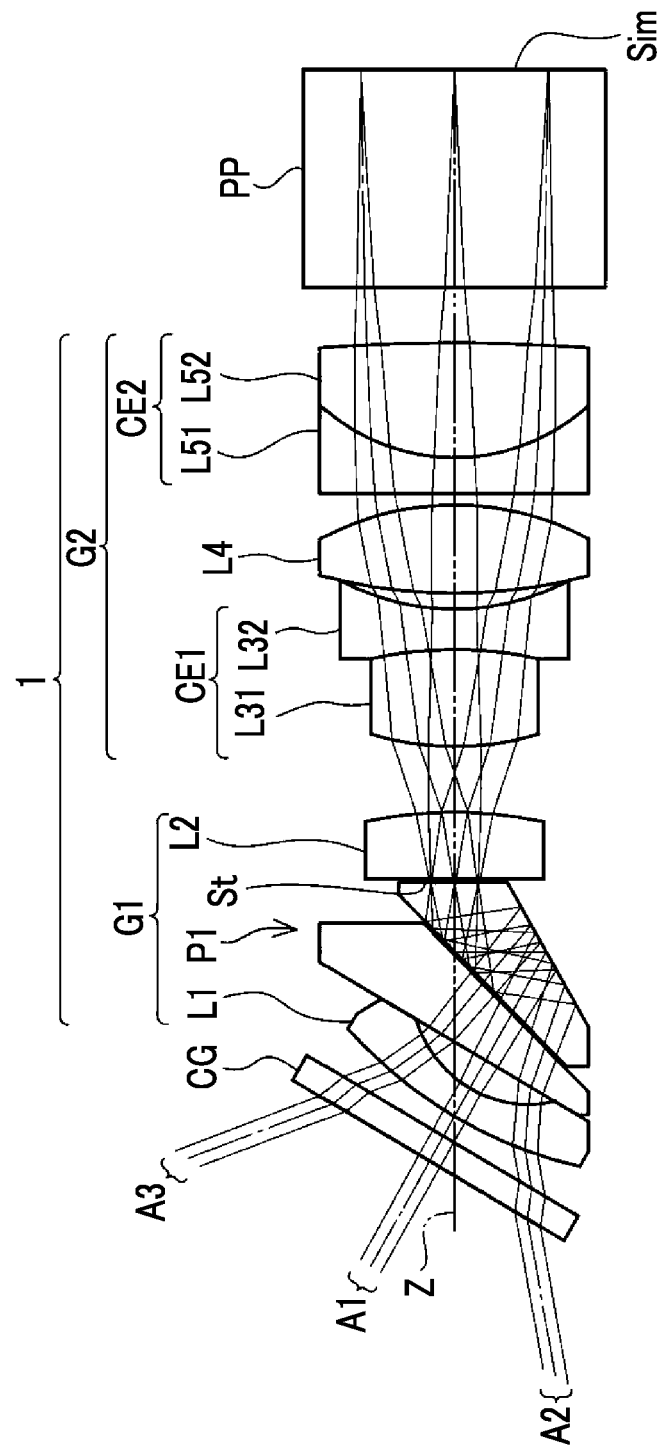
FIG. 14 is a cross-sectional view showing the configuration and luminous flux of an objective optical system for an endoscope of Example 4.

A cross-sectional view showing the configuration and luminous flux of an objective optical system 1 for an endoscope of Example 4 is shown in FIG. 14. Since the configuration of a front group G1 of the objective optical system 1 for an endoscope of Example 4 is the same as described above, the repeated description thereof will be omitted here. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a negative lens L51 and a positive lens L52 cemented to each other.

Figure 15:
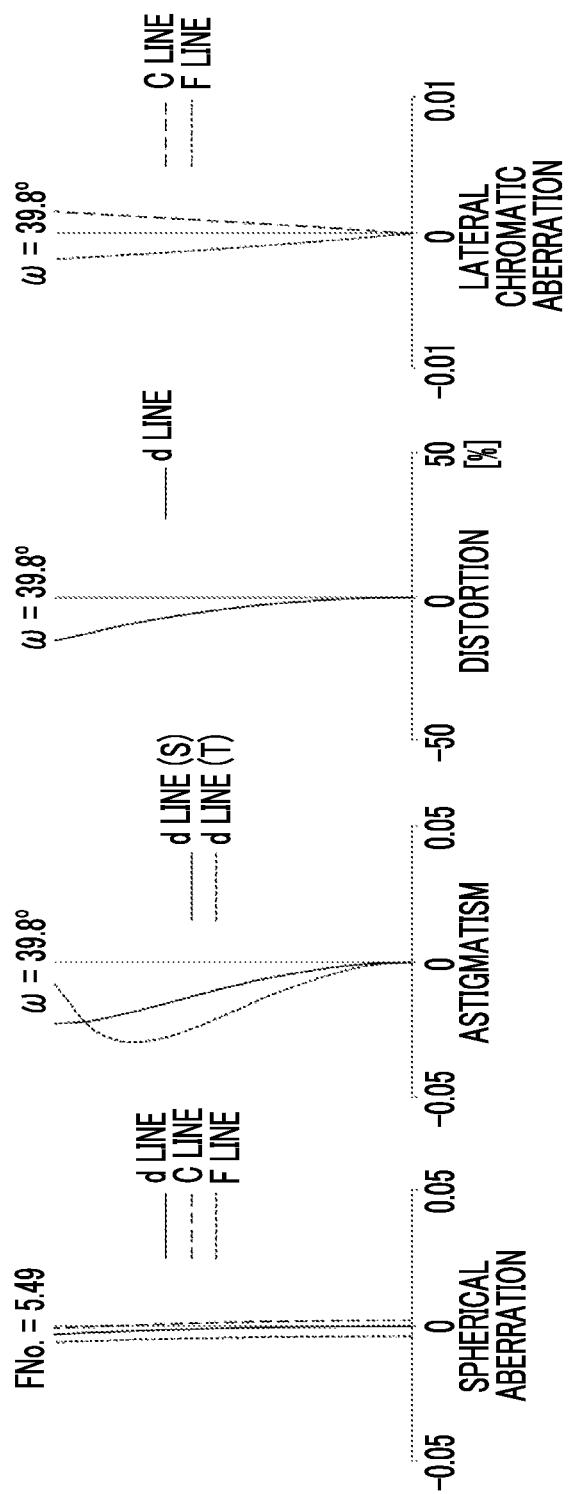
FIG. 15 is a diagram showing the respective aberrations of the objective optical system for an endoscope of Example 4.

The basic lens data of the objective optical system 1 for an endoscope of Example 4 are shown in Table 11, the specifications thereof are shown in Table 12, and a diagram showing the respective aberrations thereof is shown in FIG. 15. These data are data in a case where a distance between an object and a surface of the cover glass CG facing the object side is set to 37.7.

TABLE 11

Example 4

| Sn | R | D | Nd | vd |
|---|---|---|---|---|
| 1 | ∞ | 0.2096 | 1.76800 | 71.70 |
| 2 | ∞ | 0.1677 | | |
| 3 | 3.3566 | 0.2348 | 1.90043 | 37.37 |
| 4 | 0.8846 | 0.2348 | | |
| 5 | ∞ | 0.4000 | 2.00100 | 29.13 |

TABLE 11-continued

Example 4

| Sn | R | D | Nd | vd |
|---|---|---|---|---|
| 6 | ∞ | 0.0139 | | |
| 7 | ∞ | 0.5041 | 2.00100 | 29.13 |
| 8 | ∞ | 0.6886 | 2.00100 | 29.13 |
| 9 | ∞ | 0.5031 | 2.00100 | 29.13 |
| 10(St) | ∞ | 0.0293 | | |
| 11 | ∞ | 0.4863 | 2.10420 | 17.02 |
| 12 | −3.3566 | 0.4807 | | |
| 13 | 2.2523 | 0.7044 | 1.69680 | 55.53 |
| 14 | −2.8912 | 0.2935 | 1.92286 | 20.88 |
| 15 | 1.8691 | 0.1174 | | |
| 16 | 4.0425 | 0.6457 | 1.95375 | 32.32 |
| 17 | −2.1684 | 0.0839 | | |
| 18 | ∞ | 0.2600 | 1.69895 | 30.13 |
| 19 | 1.5244 | 0.8385 | 1.80400 | 46.53 |
| 20 | −14.5231 | 0.4074 | | |
| 21 | ∞ | 1.5932 | 2.00100 | 29.13 |
| 22 | ∞ | 0.0000 | | |

TABLE 12

Example 4

| | |
|---|---|
| f | 1.00 |
| Bf | 1.18 |
| FNo. | 5.49 |
| 2ω(°) | 79.6 |

EXAMPLE 5

Figure 16:
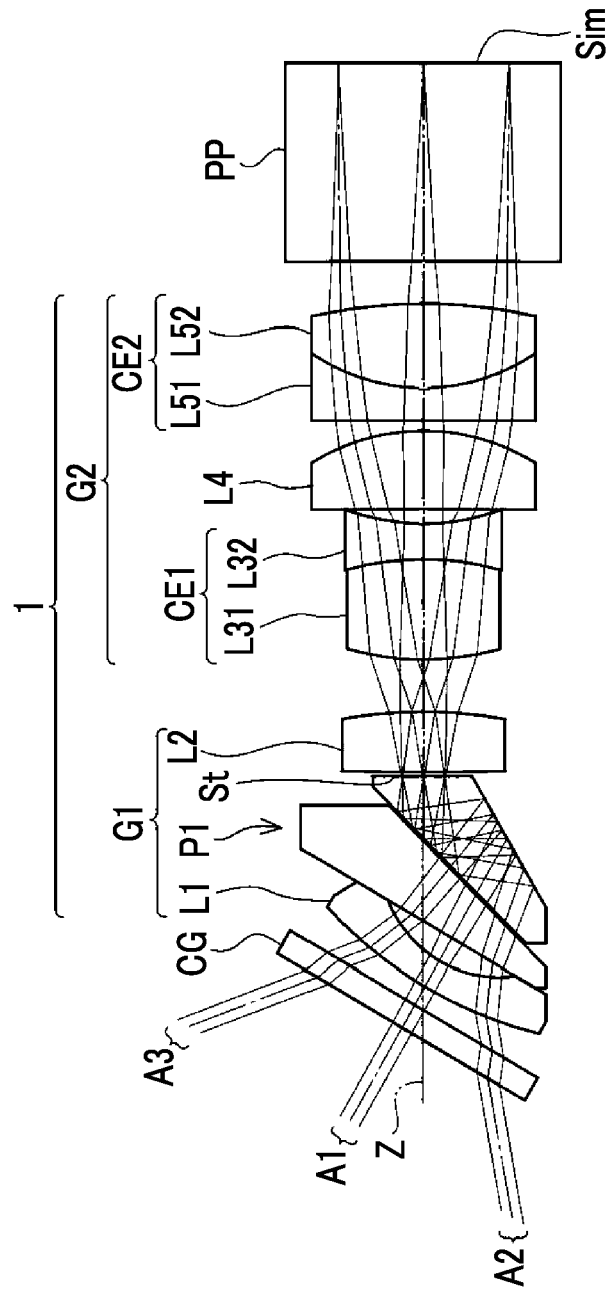
FIG. 16 is a cross-sectional view showing the configuration and luminous flux of an objective optical system for an endoscope of Example 5.

A cross-sectional view showing the configuration and luminous flux of an objective optical system 1 for an endoscope of Example 5 is shown in FIG. 16. Since the configuration of a front group G1 of the objective optical system 1 for an endoscope of Example 5 is the same as described above, the repeated description thereof will be omitted here. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a negative lens L51 and a positive lens L52 cemented to each other.

Figure 17:
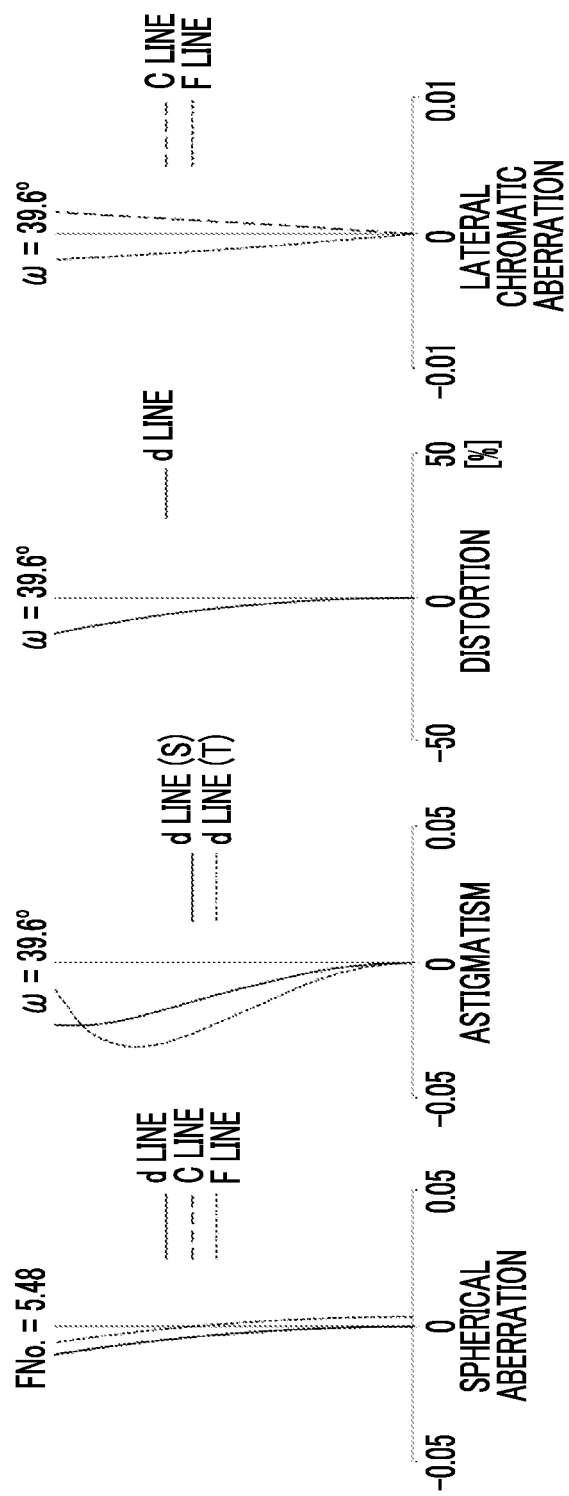
FIG. 17 is a diagram showing the respective aberrations of the objective optical system for an endoscope of Example 5.

The basic lens data of the objective optical system 1 for an endoscope of Example 5 are shown in Table 13, the specifications thereof are shown in Table 14, and a diagram showing the respective aberrations thereof is shown in FIG. 17. These data are data in a case where a distance between an object and a surface of the cover glass CG facing the object side is set to 38.4.

TABLE 13

Example 5

| Sn | R | D | Nd | vd |
|---|---|---|---|---|
| 1 | ∞ | 0.2136 | 1.76800 | 71.70 |
| 2 | ∞ | 0.1709 | | |
| 3 | 3.6370 | 0.2392 | 2.05090 | 26.94 |
| 4 | 1.0039 | 0.2136 | | |
| 5 | ∞ | 0.4075 | 2.00100 | 29.13 |
| 6 | ∞ | 0.0142 | | |
| 7 | ∞ | 0.5136 | 2.00100 | 29.13 |
| 8 | ∞ | 0.7016 | 2.00100 | 29.13 |
| 9 | ∞ | 0.5126 | 2.00100 | 29.13 |
| 10(St) | ∞ | 0.0299 | | |
| 11 | 24.3553 | 0.4955 | 2.10420 | 17.02 |
| 12 | −3.8839 | 0.4272 | | |
| 13 | 2.3785 | 0.8202 | 1.80400 | 46.53 |
| 14 | −2.3785 | 0.2891 | 1.89286 | 20.36 |
| 15 | 1.9044 | 0.1196 | | |
| 16 | −85.572 | 0.6408 | 1.90043 | 37.37 |
| 17 | −1.8181 | 0.0854 | | |
| 18 | ∞ | 0.2648 | 1.72825 | 28.46 |
| 19 | 1.7045 | 0.6835 | 1.80400 | 46.53 |
| 20 | −4.2735 | 0.3445 | | |
| 21 | ∞ | 1.6233 | 1.55919 | 53.90 |
| 22 | ∞ | 0.0000 | | |

TABLE 14

Example 5

| | |
|---|---|
| f | 1.00 |
| Bf | 1.36 |
| FNo. | 5.48 |
| 2ω(°) | 79.2 |

EXAMPLE 5A

Figure 18:
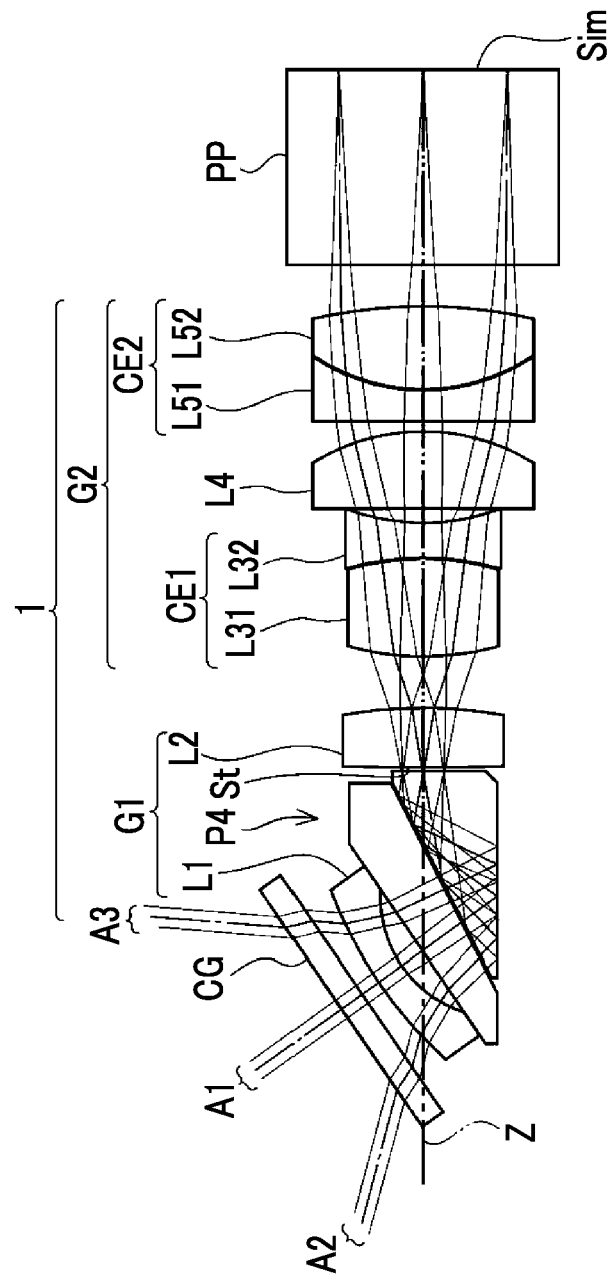
FIG. 18 is a cross-sectional view showing the configuration and luminous flux of an objective optical system for an endoscope of Example 5A.
Figure 19:
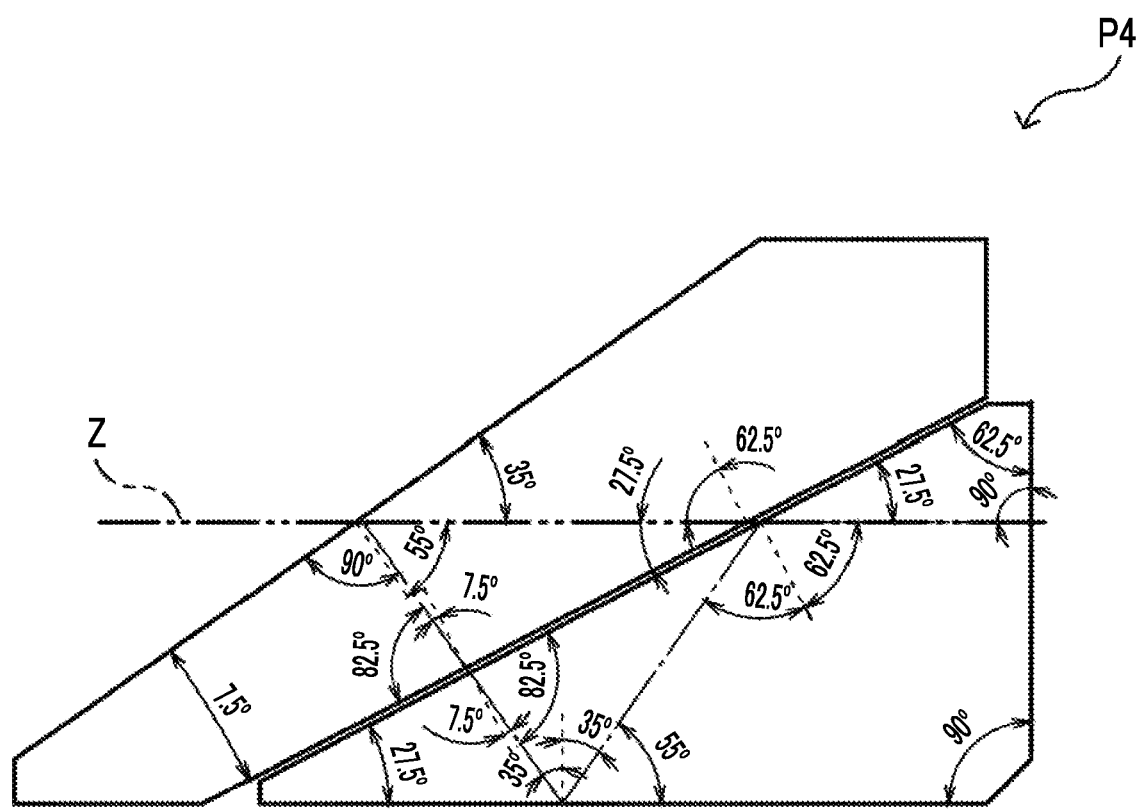
FIG. 19 is a diagram showing the configuration of an optical path deflecting prism P4.

A cross-sectional view showing the configuration and luminous flux of an objective optical system 1 for an endoscope of Example 5A as a modification example of Example 5 is shown in FIG. 18. In Example 5A, the optical path deflecting prism P1 of Example 5 is replaced with an optical path deflecting prism P4 shown in FIG. 19. Since the configuration of the objective optical system 1 for an endoscope of Example 5A other than replaced portion is the same as that of Example 5, the repeated description thereof will be omitted here.

The basic lens data of the objective optical system 1 for an endoscope of Example 5A are shown in Table 15 and the specifications thereof are shown in Table 16. A diagram showing the respective aberrations of the objective optical system 1 for an endoscope of Example 5A is the same as that of Example 5 shown in FIG. 17. These data are data in a case where a distance between an object and a surface of the cover glass CG facing the object side is set to 38.4.

TABLE 15

Example 5A

| Sn | R | D | Nd | vd |
|---|---|---|---|---|
| 1 | ∞ | 0.2136 | 1.76800 | 71.70 |
| 2 | ∞ | 0.1709 | | |
| 3 | 3.6370 | 0.2392 | 2.05090 | 26.94 |
| 4 | 1.0039 | 0.2136 | | |
| 5 | ∞ | 0.4075 | 2.00100 | 29.13 |
| 6 | ∞ | 0.0142 | | |
| 7 | ∞ | 0.3584 | 2.00100 | 29.13 |
| 8 | ∞ | 0.7695 | 2.00100 | 29.13 |
| 9 | ∞ | 0.6000 | 2.00100 | 29.13 |
| 10(St) | ∞ | 0.0299 | | |
| 11 | 24.3553 | 0.4955 | 2.10420 | 17.02 |
| 12 | −3.8839 | 0.4272 | | |
| 13 | 2.3785 | 0.8202 | 1.80400 | 46.53 |
| 14 | −2.3785 | 0.2891 | 1.89286 | 20.36 |
| 15 | 1.9044 | 0.1196 | | |
| 16 | −85.572 | 0.6408 | 1.90043 | 37.37 |
| 17 | −1.8181 | 0.0854 | | |

TABLE 15-continued

Example 5A

| Sn | R | D | Nd | vd |
|---|---|---|---|---|
| 18 | ∞ | 0.2648 | 1.72825 | 28.46 |
| 19 | 1.7045 | 0.6835 | 1.80400 | 46.53 |
| 20 | −4.2735 | 0.3445 | | |
| 21 | ∞ | 1.6233 | 1.55919 | 53.90 |
| 22 | ∞ | 0.0000 | | |

TABLE 16

Example 5A

| | |
|---|---|
| f | 1.00 |
| Bf | 1.36 |
| FNo. | 5.48 |
| 2ω(°) | 79.2 |

EXAMPLE 6

Figure 20:
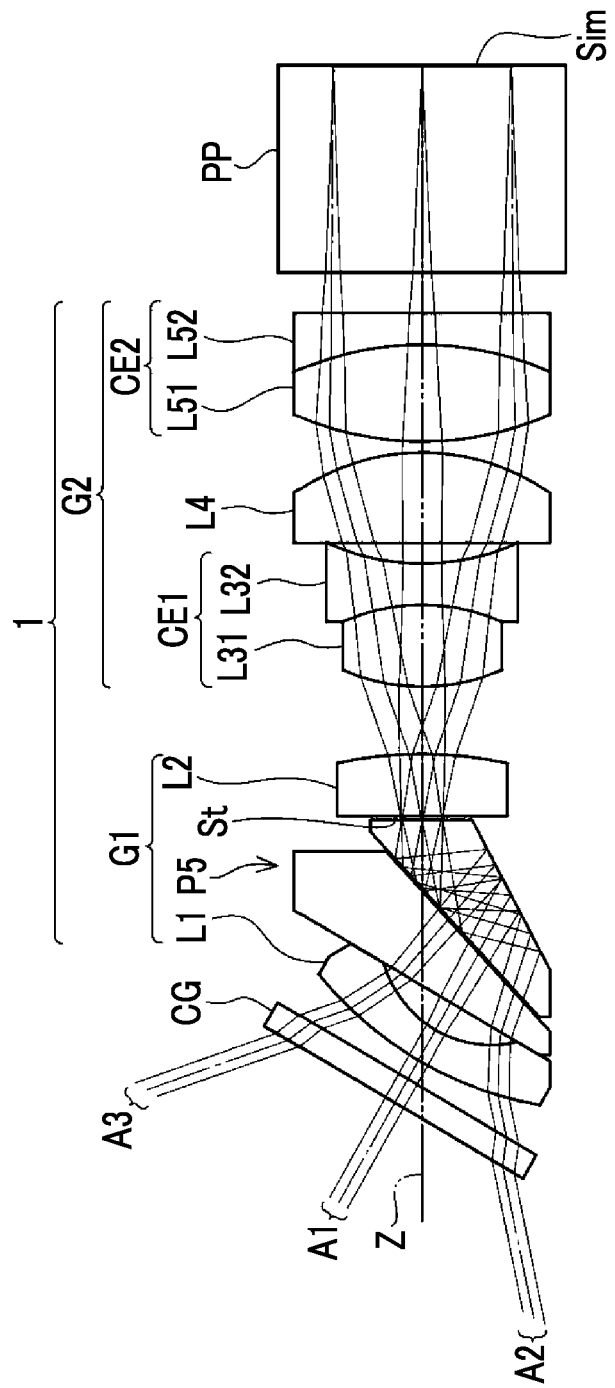
FIG. 20 is a cross-sectional view showing the configuration and luminous flux of an objective optical system for an endoscope of Example 6.
Figure 21:
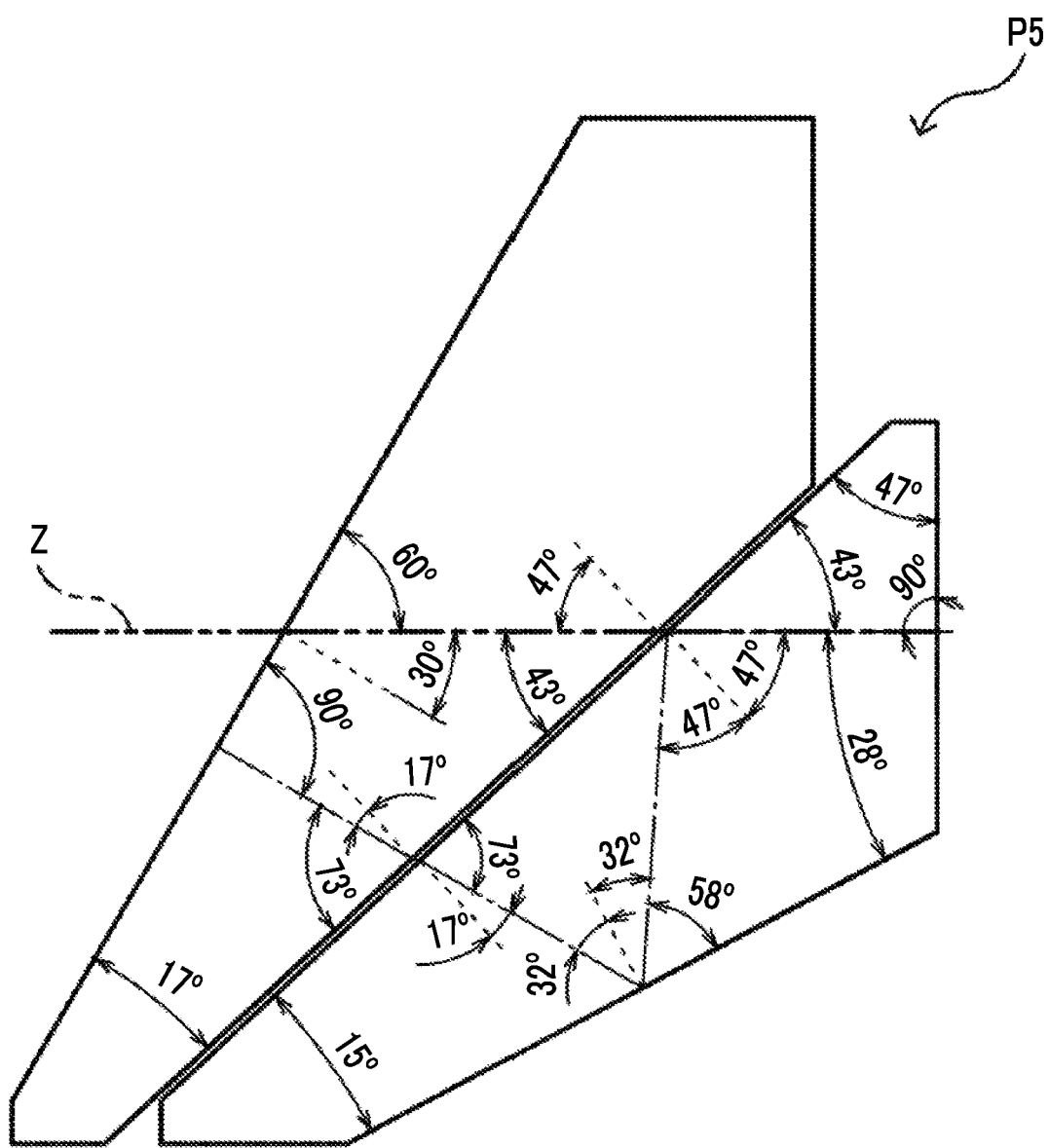
FIG. 21 is a diagram showing the configuration of an optical path deflecting prism P5.

A cross-sectional view showing the configuration and luminous flux of an objective optical system 1 for an endoscope of Example 6 is shown in FIG. 20. In a front group G1 of the objective optical system 1 for an endoscope of Example 6, the above-mentioned optical path deflecting prism P1 is replaced with an optical path deflecting prism P5 shown in FIG. 21. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a positive lens L51 and a negative lens L52 cemented to each other.

Figure 22:
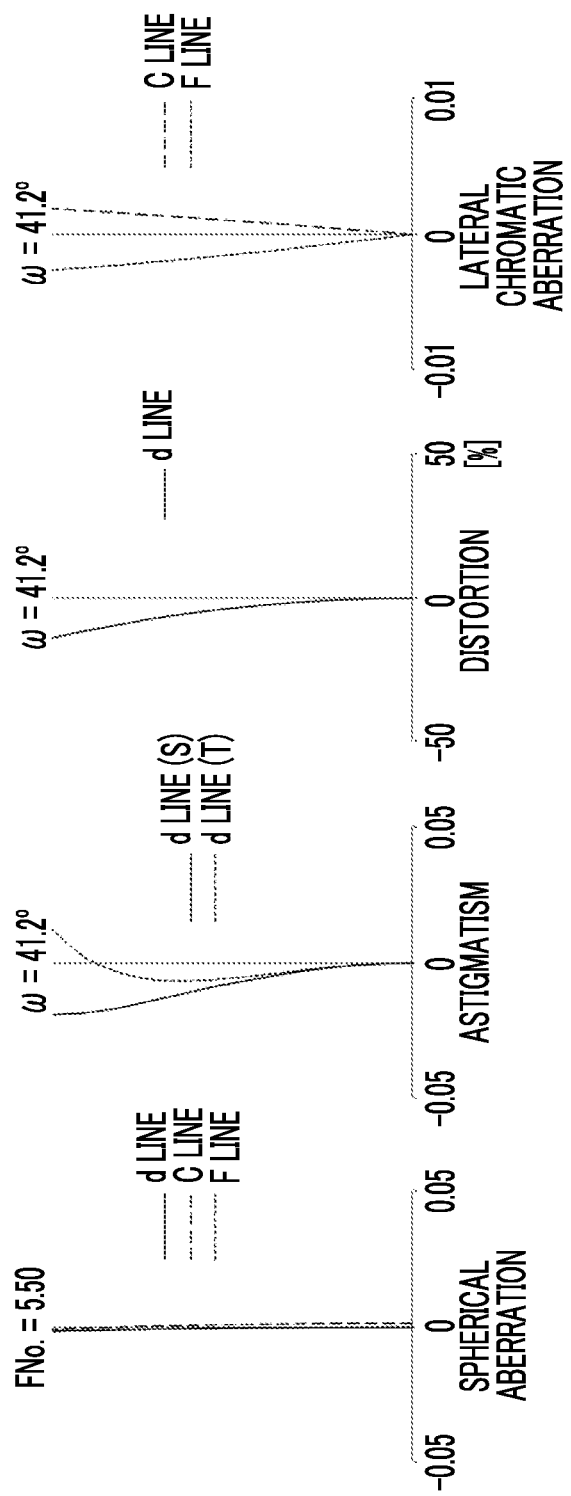
FIG. 22 is a diagram showing the respective aberrations of the objective optical system for an endoscope of Example 6.

The basic lens data of the objective optical system 1 for an endoscope of Example 6 are shown in Table 17, the specifications thereof are shown in Table 18, and a diagram showing the respective aberrations thereof is shown in FIG. 22. These data are data in a case where a distance between an object and a surface of the cover glass CG facing the object side is set to 40.1.

TABLE 17

Example 6

| Sn | R | D | Nd | vd |
|---|---|---|---|---|
| 1 | ∞ | 0.2229 | 1.76800 | 71.70 |
| 2 | ∞ | 0.1783 | | |
| 3 | 3.0739 | 0.2853 | 1.90043 | 37.37 |
| 4 | 0.9405 | 0.2585 | | |
| 5 | ∞ | 0.4689 | 1.88299 | 40.78 |
| 6 | ∞ | 0.0150 | | |
| 7 | ∞ | 0.5321 | 1.88299 | 40.78 |
| 8 | ∞ | 0.7461 | 1.88299 | 40.78 |
| 9 | ∞ | 0.5616 | 1.88299 | 40.78 |
| 10(St) | ∞ | 0.0312 | | |
| 11 | ∞ | 0.5081 | 2.00069 | 25.46 |
| 12 | −3.4741 | 0.5438 | | |
| 13 | 1.6947 | 0.6686 | 1.51680 | 64.20 |
| 14 | −1.6947 | 0.3388 | 1.67300 | 38.26 |
| 15 | 1.9871 | 0.1694 | | |
| 16 | ∞ | 0.7399 | 1.72916 | 54.68 |
| 17 | −1.8971 | 0.0891 | | |

TABLE 17-continued

Example 6

| Sn | R | D | Nd | vd |
|---|---|---|---|---|
| 18 | 2.7039 | 0.7934 | 1.77200 | 49.98 |
| 19 | −2.7039 | 0.2585 | 1.89286 | 20.36 |
| 20 | ∞ | 0.3331 | | |
| 21 | ∞ | 1.6938 | 2.00100 | 29.13 |
| 22 | ∞ | 0.0000 | | |

TABLE 18

Example 6

| | |
|---|---|
| f | 1.00 |
| Bf | 1.16 |
| FNo. | 5.50 |
| 2ω(°) | 82.4 |

EXAMPLE 7

Figure 23:
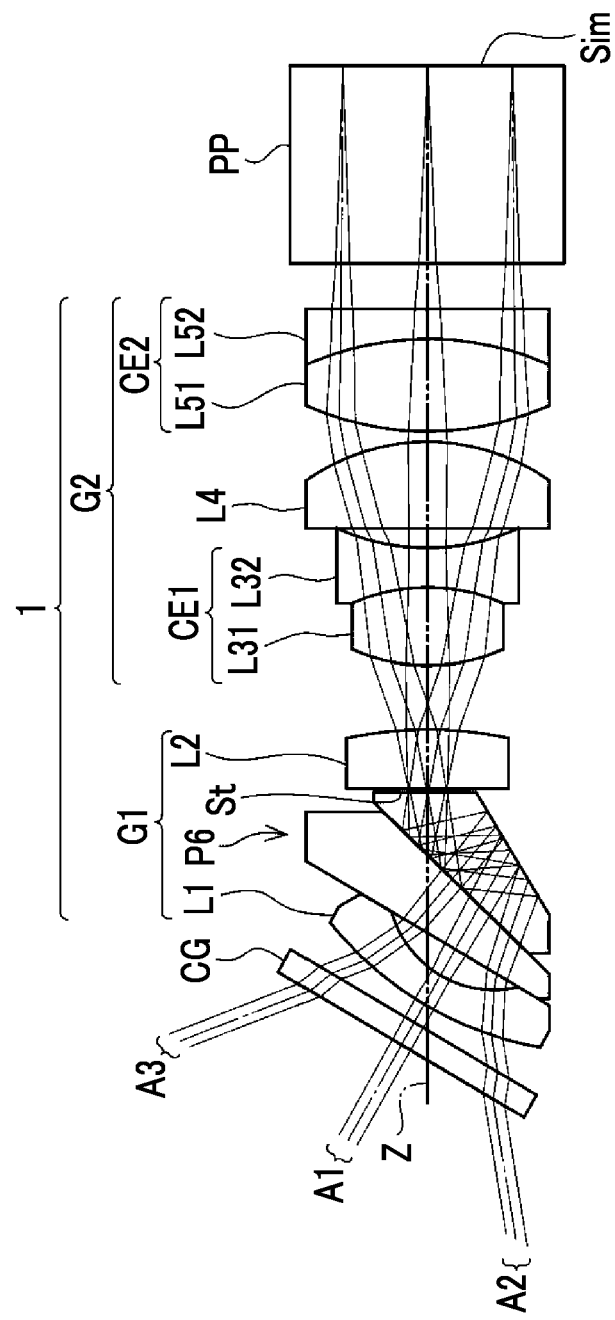
FIG. 23 is a cross-sectional view showing the configuration and luminous flux of an objective optical system for an endoscope of Example 7.
Figure 24:
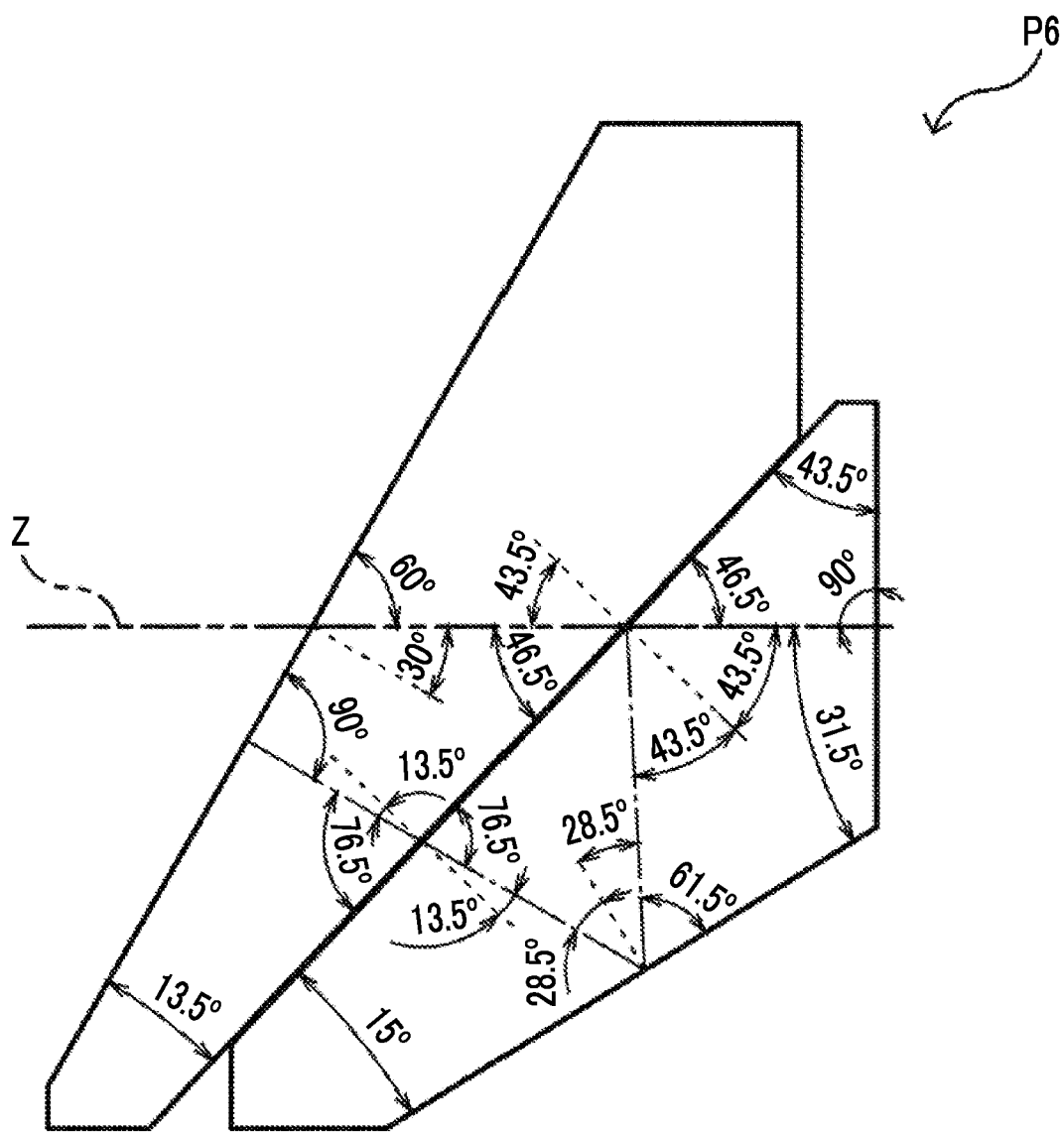
FIG. 24 is a diagram showing the configuration of an optical path deflecting prism P6.

A cross-sectional view showing the configuration and luminous flux of an objective optical system 1 for an endoscope of Example 7 is shown in FIG. 23. In a front group G1 of the objective optical system 1 for an endoscope of Example 7, the above-mentioned optical path deflecting prism P1 is replaced with an optical path deflecting prism P6 shown in FIG. 24. A rear group G2 consists of a cemented lens CE1, a positive lens L4, and a cemented lens CE2 arranged in order from the object side toward the image side. The cemented lens CE1 is formed of a positive lens L31 and a negative lens L32 cemented to each other, and the cemented lens CE2 is formed of a positive lens L51 and a negative lens L52 cemented to each other.

Figure 25:
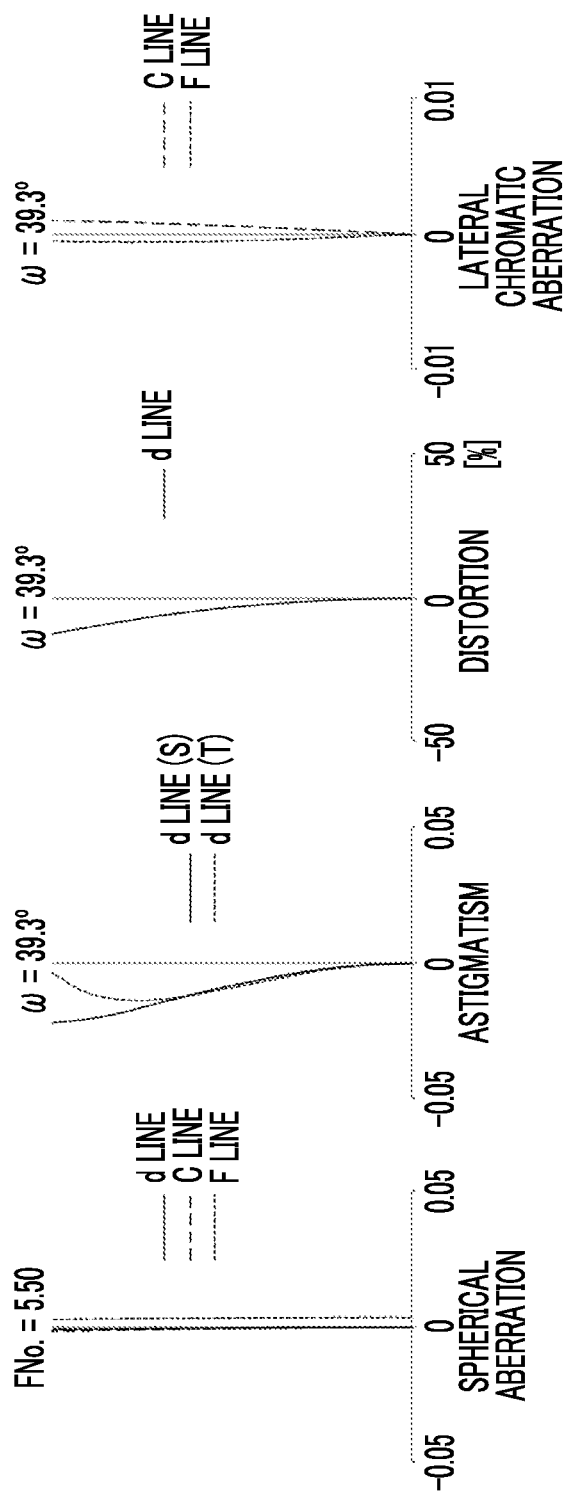
FIG. 25 is a diagram showing the respective aberrations of the objective optical system for an endoscope of Example 7.

The basic lens data of the objective optical system 1 for an endoscope of Example 7 are shown in Table 19, the specifications thereof are shown in Table 20, and a diagram showing the respective aberrations thereof is shown in FIG. 25. These data are data in a case where a distance between an object and a surface of the cover glass CG facing the object side is set to 38.3.

TABLE 19

Example 7

| Sn | R | D | Nd | vd |
|---|---|---|---|---|
| 1 | ∞ | 0.2125 | 1.76800 | 71.70 |
| 2 | ∞ | 0.1700 | | |
| 3 | 2.9313 | 0.2720 | 1.90043 | 37.37 |
| 4 | 0.8969 | 0.2465 | | |
| 5 | ∞ | 0.4102 | 2.05090 | 26.94 |
| 6 | ∞ | 0.0044 | | |
| 7 | ∞ | 0.5216 | 2.05090 | 26.94 |
| 8 | ∞ | 0.6992 | 2.05090 | 26.94 |
| 9 | ∞ | 0.5101 | 2.05090 | 26.94 |
| 10(St) | ∞ | 0.0298 | | |
| 11 | ∞ | 0.4846 | 2.00069 | 25.46 |
| 12 | −3.3131 | 0.5186 | | |
| 13 | 1.6161 | 0.6376 | 1.51680 | 64.20 |
| 14 | −1.6161 | 0.3231 | 1.67300 | 38.26 |
| 15 | 1.8950 | 0.1615 | | |

TABLE 19-continued

Example 7

| Sn | R | D | Nd | vd |
|---|---|---|---|---|
| 16 | ∞ | 0.7056 | 1.72916 | 54.68 |
| 17 | −1.8091 | 0.0850 | | |
| 18 | 2.5785 | 0.7566 | 1.77200 | 49.98 |
| 19 | −2.5785 | 0.2465 | 1.89286 | 20.36 |
| 20 | ∞ | 0.3750 | | |
| 21 | ∞ | 1.6153 | 2.00100 | 29.13 |
| 22 | ∞ | 0.0000 | | |

TABLE 20

Example 7

| | |
|---|---|
| f | 1.00 |
| Bf | 1.16 |
| FNo. | 5.50 |
| 2ω(°) | 78.6 |

EXAMPLE 8

Figure 26:
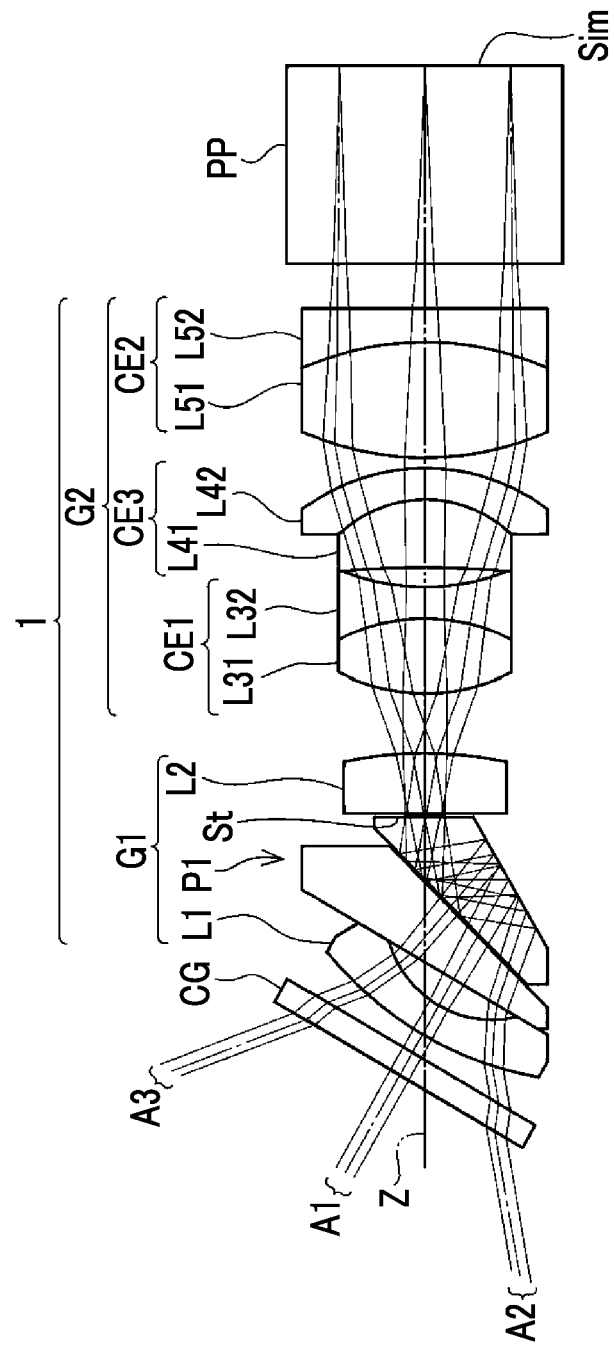
FIG. 26 is a cross-sectional view showing the configuration and luminous flux of an objective optical system for an endoscope of Example 8.

A cross-sectional view showing the configuration and luminous flux of an objective optical system 1 for an endoscope of Example 8 is shown in FIG. 26. Since the configuration of a front group G1 of the objective optical system 1 for an endoscope of Example 8 is the same as described above, the repeated description thereof will be omitted here. A rear group G2 consists of a cemented lens CE1, a cemented lens CE3, and a cemented lens CE2 arranged in order from the object side toward the image side. The cemented lens CE1 is formed of a positive lens L31 and a negative lens L32 cemented to each other, the cemented lens CE3 is formed of a positive lens L41 and a negative lens L42 cemented to each other, and the cemented lens CE2 is formed of a positive lens L51 and a negative lens L52 cemented to each other.

Figure 27:
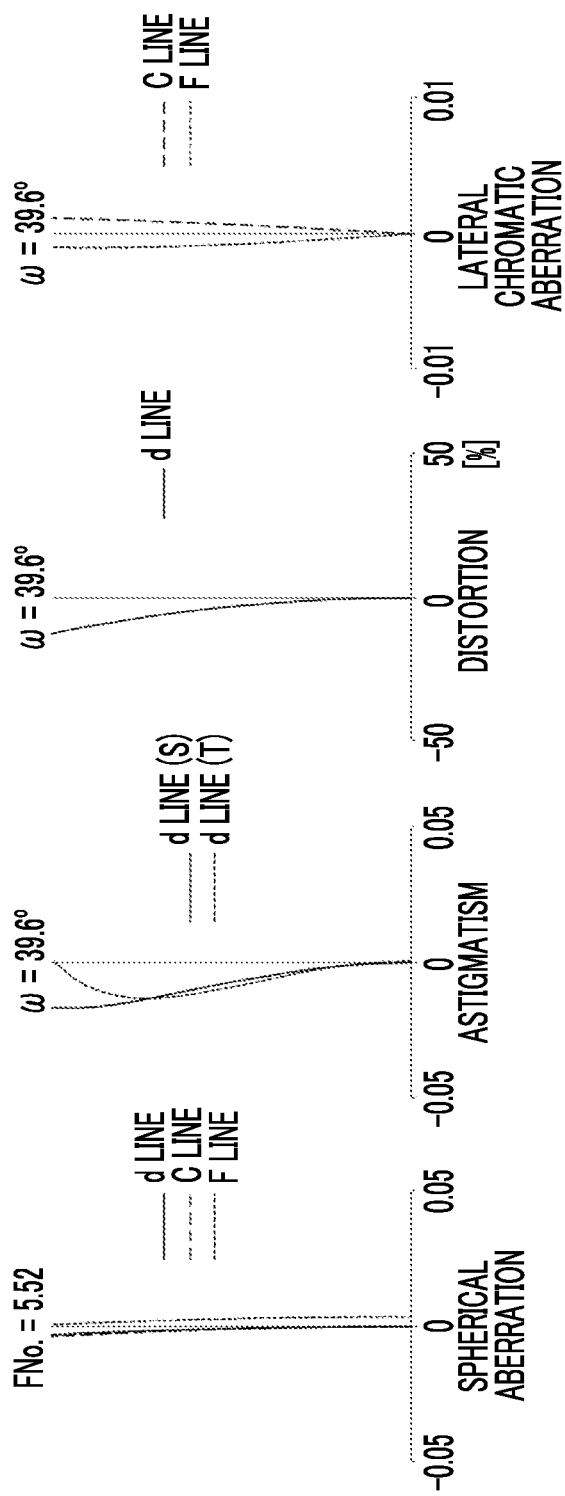
FIG. 27 is a diagram showing the respective aberrations of the objective optical system for an endoscope of Example 8.

The basic lens data of the objective optical system 1 for an endoscope of Example 8 are shown in Table 21, the specifications thereof are shown in Table 22, and a diagram showing the respective aberrations thereof is shown in FIG. 27. These data are data in a case where a distance between an object and a surface of the cover glass CG facing the object side is set to 38.4.

TABLE 21

Example 8

| Sn | R | D | Nd | vd |
|---|---|---|---|---|
| 1 | ∞ | 0.2136 | 1.76800 | 71.70 |
| 2 | ∞ | 0.1709 | | |
| 3 | 2.9460 | 0.2734 | 1.90043 | 37.37 |
| 4 | 0.9014 | 0.2478 | | |
| 5 | ∞ | 0.4075 | 2.00100 | 29.13 |
| 6 | ∞ | 0.0142 | | |
| 7 | ∞ | 0.5136 | 2.00100 | 29.13 |
| 8 | ∞ | 0.7016 | 2.00100 | 29.13 |
| 9 | ∞ | 0.5126 | 2.00100 | 29.13 |
| 10(St) | ∞ | 0.0299 | | |
| 11 | ∞ | 0.4956 | 2.00069 | 25.46 |
| 12 | −3.3296 | 0.4870 | | |
| 13 | 1.6242 | 0.6066 | 1.51680 | 64.20 |
| 14 | −1.6242 | 0.2563 | 1.67300 | 38.26 |
| 15 | 1.9045 | 0.1623 | | |
| 16 | −8.2620 | 0.5554 | 1.75914 | 52.09 |
| 17 | −1.0680 | 0.2563 | 1.72916 | 43.22 |
| 18 | −1.7399 | 0.0854 | | |
| 19 | 2.5914 | 0.9483 | 1.77200 | 49.98 |
| 20 | −2.5914 | 0.2734 | 1.89286 | 20.36 |
| 21 | ∞ | 0.3652 | | |
| 22 | ∞ | 1.6234 | 2.00100 | 29.13 |
| 23 | ∞ | 0.0000 | | |

TABLE 22

Example 8

| | |
|---|---|
| f | 1.00 |
| Bf | 1.15 |
| FNo. | 5.52 |
| 2ω(°) | 79.2 |

Values of Conditional expressions (1) to (6) corresponding to the objective optical systems for an endoscope of Examples 1 to 8 are shown in Table 23. In Examples 1 to 8, a d line is used as a reference wavelength. Table 23 shows values with respect to a d line.

TABLE 23

| Expression No. | Conditional expression | Example 1 | Example 2 | Example 3 | Example 4 |
|---|---|---|---|---|---|
| (1) | $\left\|(vna - vpa) \times \dfrac{Lca}{Rca}\right\| \times \left\|(vnb - vpb) \times \dfrac{Lcb}{Rcb}\right\| \times \dfrac{f}{fg}$ | 634 | 560 | 790 | 321 |
| (2) | $\left(\sum_{i=1}^{k}\left\|(vnt - vpi) \times \dfrac{Lci}{Rct}\right\|\right) \times \left\|\dfrac{ff}{fg}\right\|$ | 545 | 703 | 1097 | 821 |
| (3) | $Bf/f$ | 1.623 | 1154 | 1.603 | 1.176 |
| (4) | $\dfrac{Rr1 + Rf1}{Rr1 - Rf1} \times \dfrac{f}{f1}$ | 1.127 | 1.218 | 1.165 | 1.230 |

TABLE 23-continued

| Expression No. | Conditional expression | Example 5 | Example 6 | Example 7 | Example 8 |
|---|---|---|---|---|---|
| (5) | $\left(\dfrac{Rr1+Rf1}{Rr1-Rf1}\right)/Nd1$ | −0.823 | −0.990 | −0.815 | −0.903 |
| (6) | $\left\|\dfrac{Lf}{Ndp \times F1}\right\|$ | 0.915 | 0.867 | 0.910 | 0.923 |
| (1) | $\left\|(vna-vpa)\times\dfrac{Lca}{Rca}\right\|\times\left\|(vnb-vpb)\times\dfrac{Lcb}{Rcb}\right\|\times\dfrac{f}{fg}$ | 310 | 539 | 565 | 562 |
| (2) | $\left(\sum_{i=1}^{k}\left\|(vnt-vpi)\times\dfrac{Lci}{Rct}\right\|\right)\times\left\|\dfrac{ff}{fg}\right\|$ | 554 | 1227 | 632 | 939 |
| (3) | Bf/f | 1.359 | 1.152 | 1.155 | 1.149 |
| (4) | $\dfrac{Rr1+Rf1}{Rr1-Rf1}\times\dfrac{f}{f1}$ | 1.275 | 1.174 | 1.230 | 1.224 |
| (5) | $\left(\dfrac{Rr1+Rf1}{Rr1-Rf1}\right)/Nd1$ | −0.859 | −0.990 | −0.990 | −0.990 |
| (6) | $\left\|\dfrac{Lf}{Ndp\times F1}\right\|$ | 0.940 | 0.948 | 0.848 | 0.867 |

It is found from the above-mentioned data that each of the objective optical systems for an endoscope of Examples 1 to 8 satisfies Conditional expressions (1) to (6), is adapted to have a wide total angle of view of 75° or more, and has a small size and good optical performance in which various aberrations are satisfactorily corrected.

Values of Conditional expressions (7) to (11) corresponding to the objective optical systems for an endoscope of Examples 1, 2A, 3A, 5A, 6, and 7 are shown in Table 24. In Examples 1, 2A, 3A, 5A, 6, and 7, a d line is used as a reference wavelength. Table 24 shows values with respect to a d line.

TABLE 24

| Expression No. | Conditional expression | Example 1 | Example 2A | Example 3A | Example 5A | Example 6 | Example 7 |
|---|---|---|---|---|---|---|---|
| (7) | f/Dp | 73.53 | 70.42 | 74.63 | 70.42 | 66.67 | 227.27 |
| (8) | \|θ1 − θ2\| | 15.0 | 15.0 | 15.0 | 7.5 | 17.0 | 13.5 |
| (9) | (GLf + GLs)/Dp | 150.53 | 151.13 | 150.54 | 150.37 | 153.91 | 486.61 |
| (10) | (GLs/GLf)/Ndp | 2.12 | 2.12 | 2.07 | 2.12 | 2.08 | 2.06 |
| (11) | (2ω × Ndp)/\|θ1 − θ2\| | 10.59 | 10.59 | 10.75 | 21.13 | 9.13 | 11.94 |

It is found from the above-mentioned data that each of the objective optical systems for an endoscope of Examples 1, 2A, 3A, 5A, 6, and 7 satisfies Conditional expressions (7) to (11), is adapted to have a wide total angle of view of 75° or more, and has a small size and good optical performance in which an asymmetric image plane tilt is suppressed.

Figure 28:
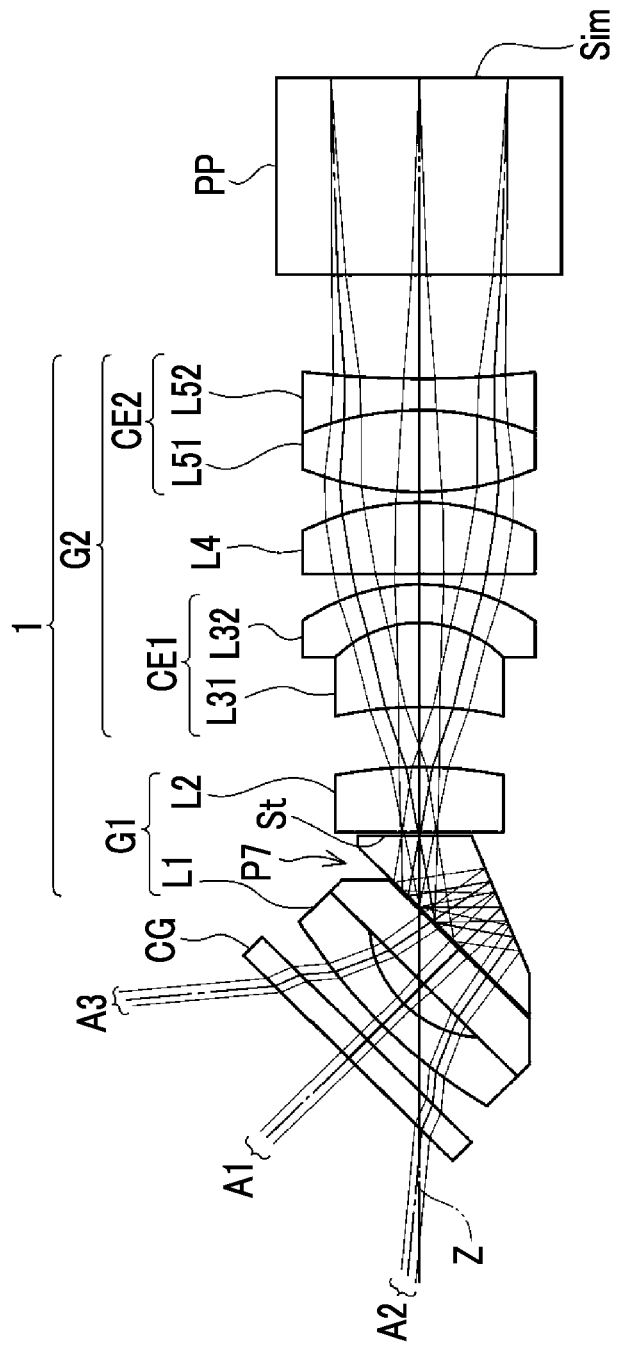
FIG. 28 is a cross-sectional view showing another configuration and luminous flux of the objective optical system for an endoscope of Example 1.
Figure 29:
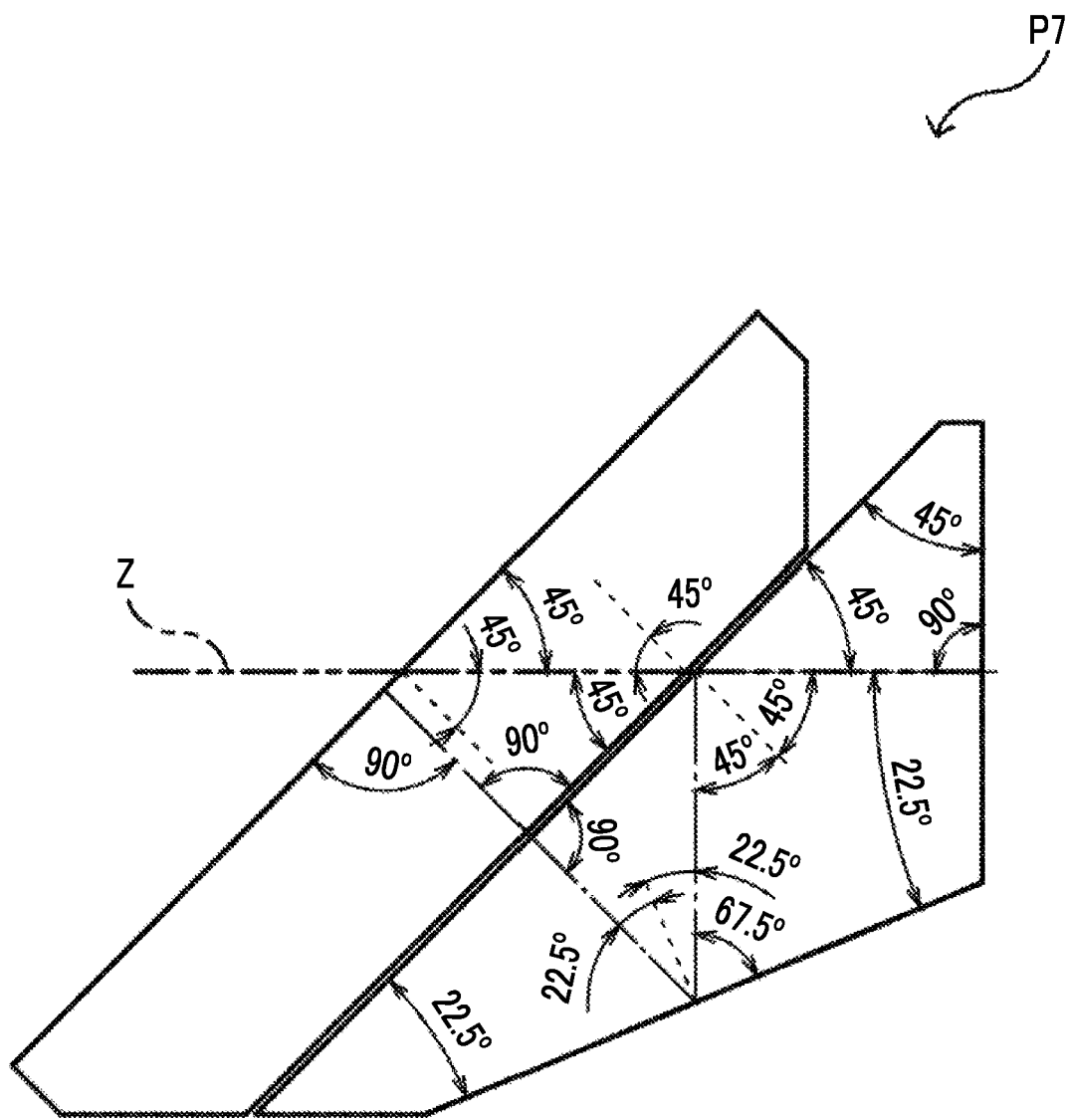
FIG. 29 is a diagram showing the configuration of an optical path deflecting prism P7.
Figure 30:
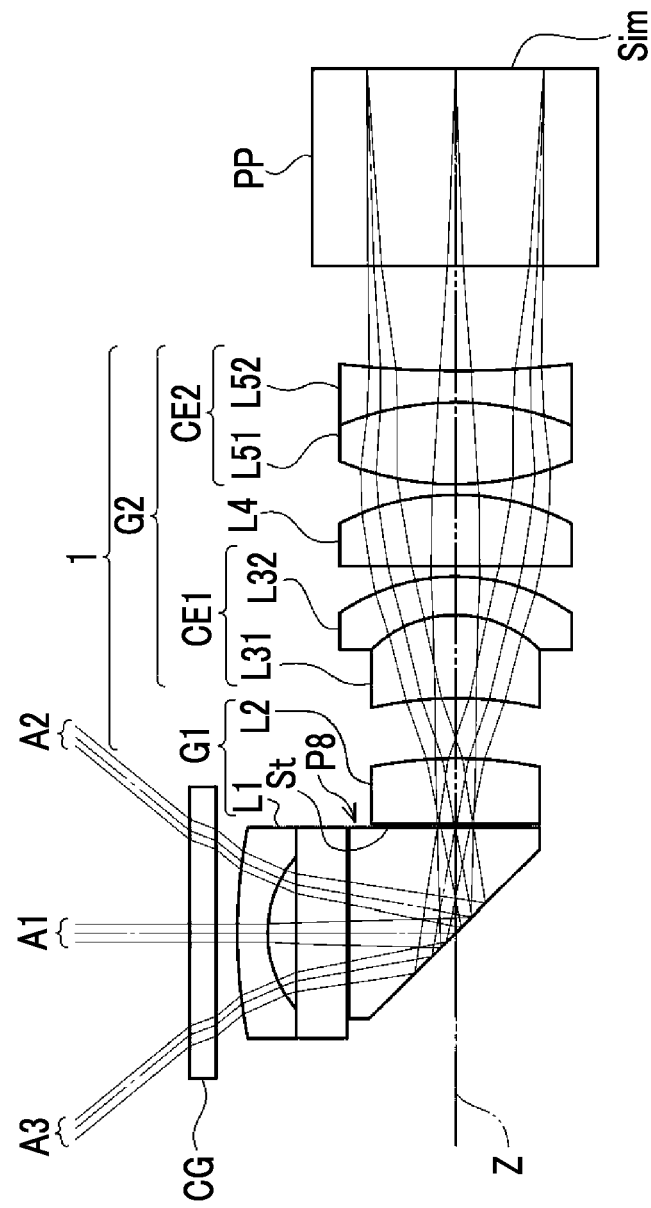
FIG. 30 is a cross-sectional view showing another configuration and luminous flux of the objective optical system for an endoscope of Example 1.
Figure 31:
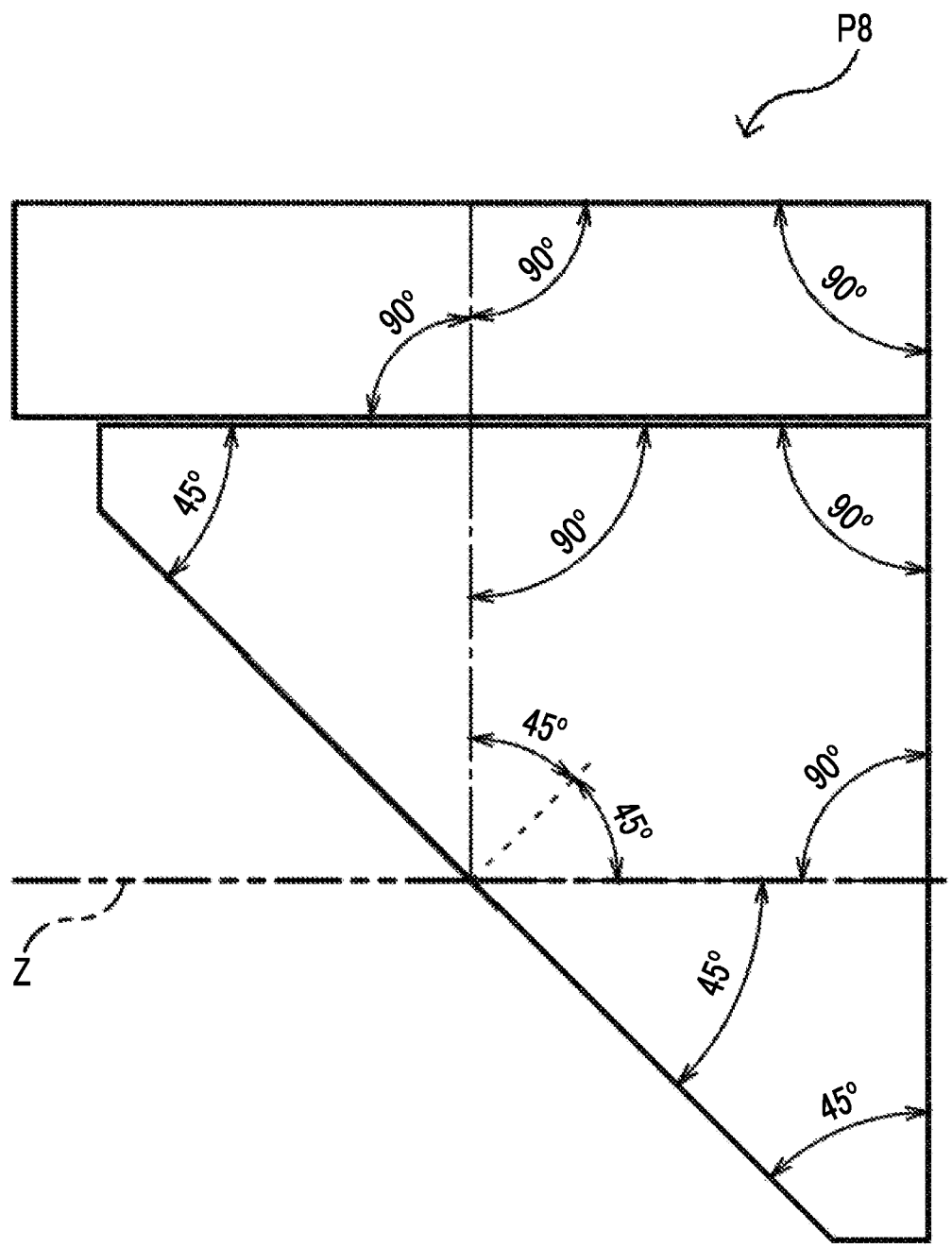
FIG. 31 is a diagram showing the configuration of an optical path deflecting prism P8.

An optical path deflecting prism to be used in the objective optical system 1 for an endoscope according to the exemplary embodiment of the present disclosure is not limited to the above-mentioned optical path deflecting prisms P1 to P6. For example, a cross-sectional view showing a configuration and luminous flux in a case where the optical path deflecting prism P1 is replaced with an optical path deflecting prism P7 shown in FIG. 29 in the objective optical system 1 for an endoscope of Example 1 is shown in FIG. 28. Further, a cross-sectional view showing a configuration and luminous flux in a case where the optical path deflecting prism P1 is replaced with an optical path deflecting prism P8 shown in FIG. 31 in the objective optical system 1 for an endoscope of Example 1 is shown in FIG. 30. The objective optical system 1 for an endoscope shown in FIG. 30 is a side-viewing endoscope. As shown in FIGS. 28 to 31, any optical path deflecting prism can be applied to the objective optical system 1 for an endoscope according to the exemplary embodiment of the present disclosure.

Figure 32:
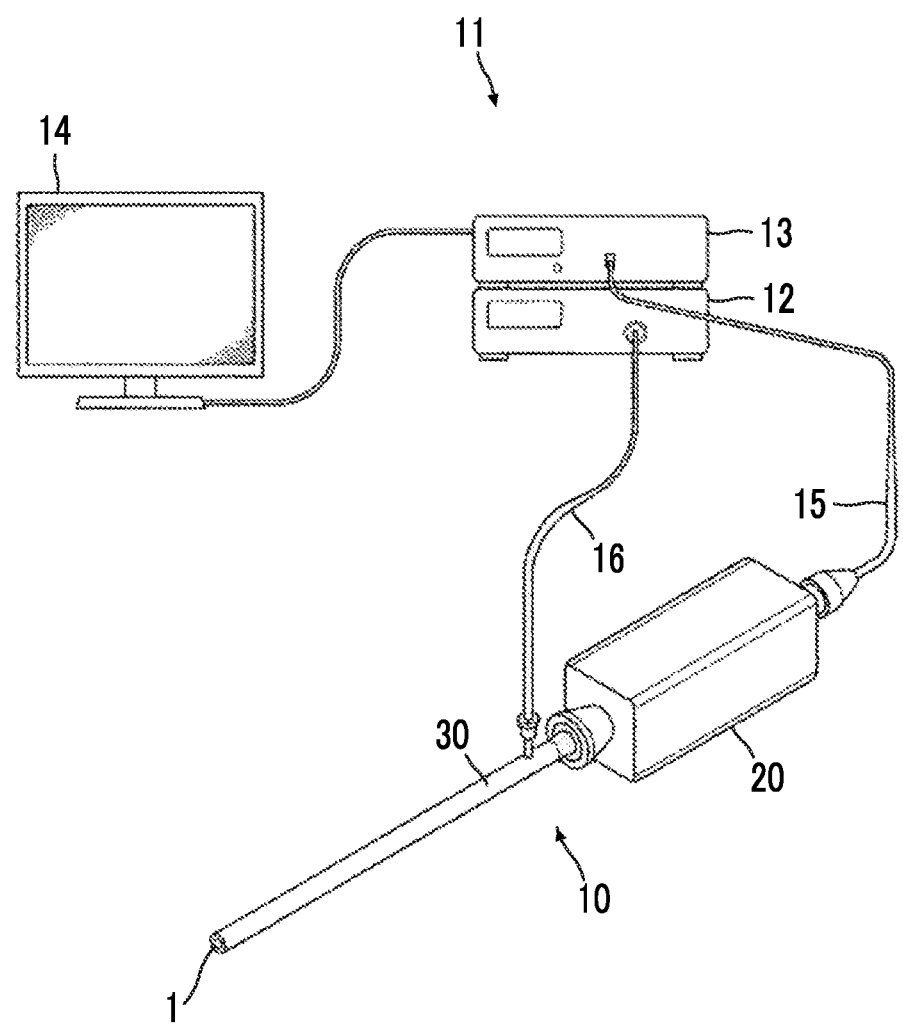
FIG. 32 is a diagram showing the schematic configuration of an endoscope system that uses an endoscope according to an exemplary embodiment of the present disclosure.

Next, an example of an endoscope according to an exemplary embodiment of the present disclosure will be described. A diagram showing the schematic configuration of an endoscope system using the endoscope according to the exemplary embodiment of the present disclosure is shown in FIG. 32. The endoscope system 11 shown in FIG. 32 includes an endoscope 10, a light source device 12, an image processing device 13, and a monitor 14. In the endoscope system 11, light emitted from the light source device 12 is guided to the endoscope 10 through an optical cable 16 and the endoscope 10 picks up the image of a portion to be observed while irradiating the portion to be observed with light. Further, the image processing device 13 acquires the image signals of the image, which is picked up by the endoscope 10, through a cable 15, performs predetermined processing on the acquired image signals, generates an image on the basis of the image signal on which the predetermined processing has been performed, and causes the monitor 14 to display the generated image.

The endoscope 10 is a so-called rigid endoscope that includes an image pickup unit 20 and a hard insertion part 30. The hard insertion part 30 is a part that is to be inserted into an abdominal cavity in a case where the image of the inside of the abdominal cavity is to be picked up, is made of a hard material, and has the shape of a column having a diameter of about 5 mm (millimeter). The objective optical system 1 for an endoscope according to the exemplary embodiment of the present disclosure is provided in the distal end of the hard insertion part 30. The objective optical system 1 for an endoscope is schematically shown in FIG. 32. The image pickup unit 20 is attachably and detachably connected to the other end side of the hard insertion part 30, and an image formed by the objective optical system 1 for an endoscope is sent to the image pickup unit 20. The image pickup unit 20 picks up the image formed by the objective optical system 1 for an endoscope and generates the image signals of the portion to be observed.

Since the endoscope according to the exemplary embodiment of the present disclosure comprises the objective optical system 1 for an endoscope according to the exemplary embodiment of the present disclosure as described above, it is possible to acquire a good image while making an observation with a wide field of view. The endoscope 10 is provided with an operation part for operating the objective optical system 1 for an endoscope so that the objective optical system 1 for an endoscope can move rotationally about the optical axis thereof, and is adapted so that the field of view of which the image is to be picked up can be easily changed.

Figure 33:
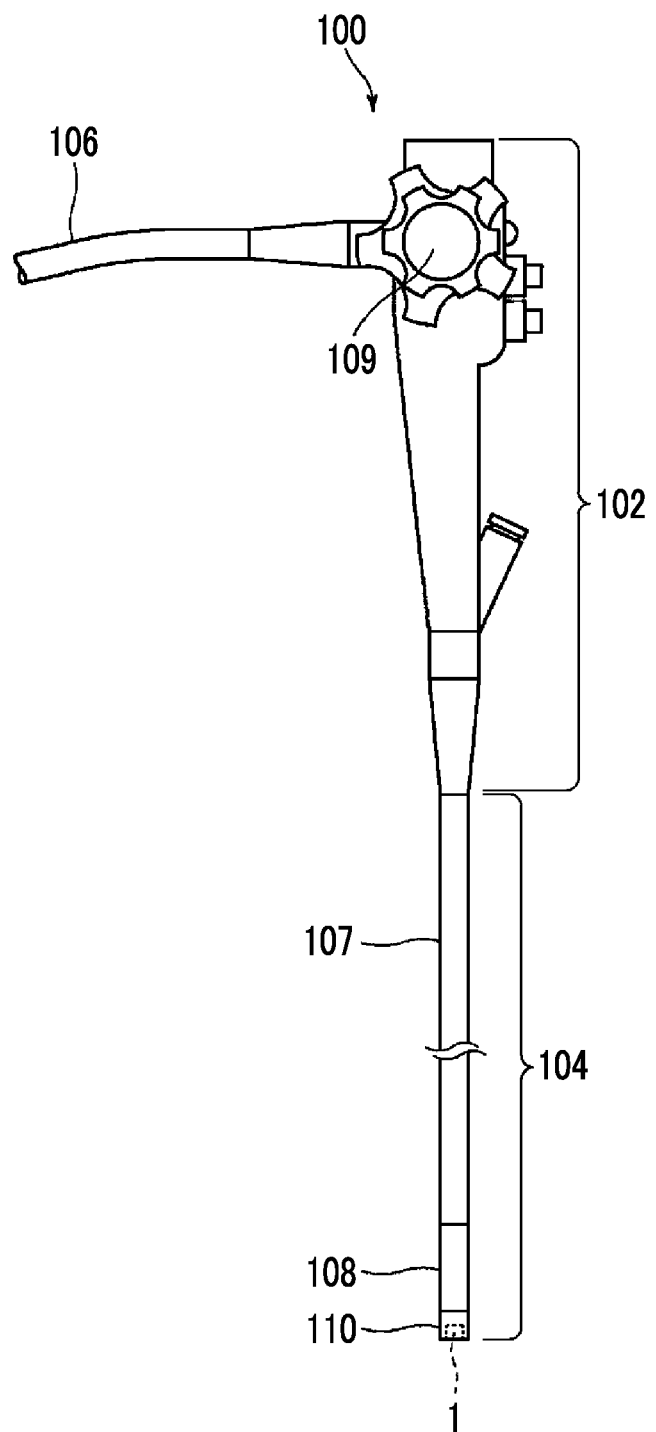
FIG. 33 is a diagram showing the schematic configuration of an endoscope according to an exemplary embodiment of the present disclosure.

Further, the endoscope according to the exemplary embodiment of the present disclosure is not limited to the above-mentioned rigid endoscope, and may be a so-called flexible endoscope of which an insertion part is made of a soft material. For example, an example of a diagram showing the entire schematic configuration of a flexible endoscope according to an exemplary embodiment of the present disclosure is shown in FIG. 33. The endoscope 100 shown in FIG. 33 mainly comprises an operation part 102, an insertion part 104, and a universal cord 106 that is to be connected to a connector part (not shown). A large portion of the insertion part 104 is a soft portion 107 that is bendable in any direction along an insertion path, a bendable portion 108 is connected to the distal end of the soft portion 107, and a distal end portion 110 is connected to the distal end of the bendable portion 108. The bendable portion 108 is provided to allow the distal end portion 110 to face in a desired direction, and can be operated to be bent by the rotational movement of bending operation knobs 109 provided on the operation part 102. An objective optical system 1 for an endoscope according to the exemplary embodiment of the present disclosure is provided in the distal end of the distal end portion 110. The objective optical system 1 for an endoscope is schematically shown in FIG. 33. Since the endoscope according to the exemplary embodiment of the present disclosure comprises the objective optical system 1 for an endoscope according to the exemplary embodiment of the present disclosure as described above, it is possible to acquire a good image while making an observation with a wide field of view.

Figure 34:
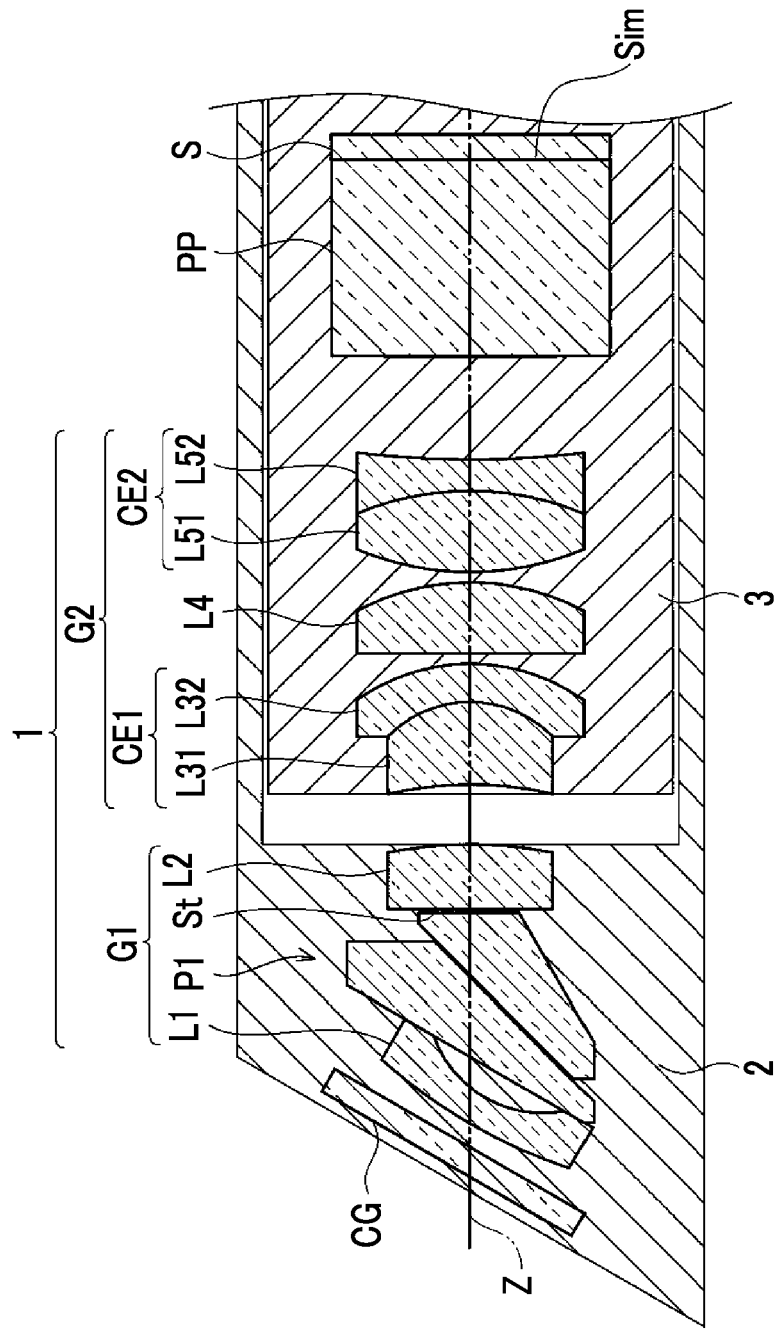
FIG. 34 is a cross-sectional view showing the configuration of an endoscope according to an exemplary embodiment of the present disclosure.

It is preferable that an endoscope according to the exemplary embodiment of the present disclosure further comprises an image pickup element S on an image plane Sim of an objective optical system 1 for an endoscope as shown in FIG. 34 by way of example, a front group G1 and a rear group G2 of the objective optical system 1 for an endoscope are adapted to be movable rotationally about the optical axis Z of the rear group G2 relative to each other, and the image pickup element S is formed integrally with the rear group G2. In the example shown in FIG. 34, the front group G1 is disposed in a distal end member 2, the rear group G2 and the image pickup element S are disposed in a housing member 3, and at least one of the distal end member 2 or the housing member 3 is adapted to be movable rotationally about the optical axis Z. That is, only the distal end member 2 may rotationally move so that only the front group G1 rotationally moves. Alternatively, only the housing member 3 may rotationally move so that only the rear group G2 and the image pickup element S integrally and rotationally move. Further, the distal end member 2 and the housing member 3 may rotationally move relative to each other so that the front group G1 and the rear group G2 and the image pickup element S rotationally move relative to each other. "Integrally and rotationally move" mentioned here means that elements rotationally move at the same time in the same direction by the same angle.

Figure 35:
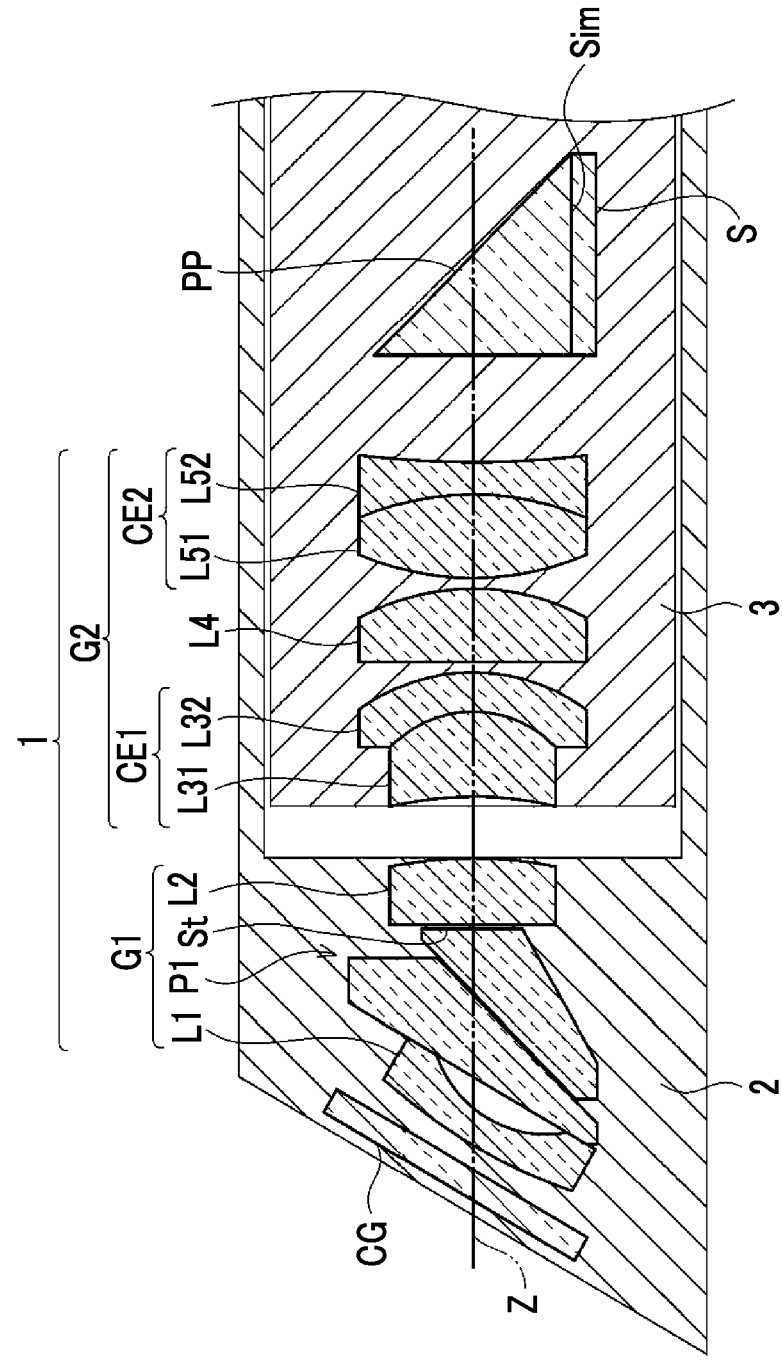
FIG. 35 is a cross-sectional view showing the configuration of an endoscope according to an exemplary embodiment of the present disclosure.

According to such a configuration, even in a case where the field of view is changed due to the rotational movement of at least one of the distal end member 2 or the housing member 3, it is possible to suppress a change in the deviation of a lateral chromatic aberration with respect to the optical axis Z and to suppress a change in the color of an image that is obtained from the image pickup element S. As shown in FIG. 35, an optical member PP, which consists of a prism, or the like may be disposed between the rear group G2 and the image pickup element S to bend an optical path. In a case where an optical path is bent, it is advantageous for a reduction in size.

A technique of the present disclosure has been described above using the exemplary embodiments and Examples, but the technique of the present disclosure can have various modifications without being limited to the exemplary embodiments and Examples. For example, the curvature radius, the surface spacing, the refractive index, the Abbe number, and the like of each lens may have other values without being limited to the values shown in the respective numerical examples.

The entire contents of the present disclosure of Japanese Patent Application No. 2020-012967, filed Jan. 29, 2020, and the present disclosure of Japanese Patent Application No. 2021-003772, filed Jan. 13, 2021, are incorporated in this specification by reference. All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

The invention claimed is:

1. An objective optical system for an endoscope consisting of, in order from an object side toward an image side:
   a front group; and
   a rear group, wherein:
   the front group consists of, in order from the object side toward the image side: one negative lens; an optical path deflecting prism; an aperture stop; and one positive lens,
   the rear group includes a plurality of cemented lenses each of which is formed of a positive lens and a negative lens cemented to each other, and
   in a case where
   a total number of the cemented lenses is denoted by k,
   a natural number in a range of 1 to k is denoted by i, an Abbe number of the positive lens of an i-th cemented lens from the object side with respect to a d line is denoted by vpi, an Abbe number of the negative lens of the i-th cemented lens from the object side with respect to the d line is denoted by vni, a distance on an optical axis between the aperture stop and a cemented surface of the i-th cemented lens from the object side is denoted by Lci, a curvature radius of the cemented surface of the i-th cemented lens from the object side is denoted by Rci, a focal length of the front group is denoted by ff, and a focal length of the rear group is denoted by fg, Conditional expression (2) is satisfied, which is represented by $$300 < \left(\sum_{i=1}^{k}\left|(vni-vpi)\times\frac{Lci}{Rci}\right|\right)\times\left|\frac{ff}{fg}\right| < 2000. \quad (2)$$

2. The objective optical system for the endoscope according to claim 1, wherein the rear group includes, in order from a side closest to the object side toward the image side, a first cemented lens and either a positive lens or a second cemented lens.

3. The objective optical system for the endoscope according to claim 1, wherein in a case where a back focus of the objective optical system for an endoscope at an equivalent air path is denoted by Bf and the focal length of the objective optical system for an endoscope is denoted by f, Conditional expression (3) is satisfied, which is represented by 0.95<Bf/f<2 (3).

4. The objective optical system for the endoscope according to claim 3, wherein Conditional expression (3-1) is satisfied, which is represented by 1<Bf/f<1.8 (3-1).

5. The objective optical system for the endoscope according to claim 1, wherein in a case where a curvature radius of a surface of the negative lens of the front group facing the image side is denoted by Rr1, a curvature radius of a surface of the negative lens of the front group facing the object side is denoted by Rf1, the focal length of the objective optical system for an endoscope is denoted by f, and a focal length of the negative lens of the front group is denoted by f1, Conditional expression (4) is satisfied, which is represented by $$0.95 < \frac{Rr1+Rf1}{Rr1-Rf1}\times\frac{f}{f1} < 1.32. \quad (4)$$

6. The objective optical system for the endoscope according to claim 5, wherein Conditional expression (4-1) is satisfied, which is represented by $$1 < \frac{Rr1+Rf1}{Rr1-Rf1}\times\frac{f}{f1} < 1.28. \quad (4-1)$$

7. The objective optical system for the endoscope according to claim 1, wherein in a case where a curvature radius of a surface of the negative lens of the front group facing the image side is denoted by Rr1, a curvature radius of a surface of the negative lens of the front group facing the object side is denoted by Rf1, and a refractive index of the negative lens of the front group with respect to the d line is denoted by Nd1, Conditional expression (5) is satisfied, which is represented by $$-1.02 < \left(\frac{Rr1+Rf1}{Rr1-Rf1}\right)\Big/Nd1 < -0.75. \quad (5)$$

8. The objective optical system for the endoscope according to claim 7, wherein Conditional expression (5-1) is satisfied, which is represented by $$-1 < \left(\frac{Rr1+Rf1}{Rr1-Rf1}\right)\Big/Nd1 < -0.8. \quad (5-1)$$

9. The objective optical system for the endoscope according to claim 1, wherein in a case where a distance on the optical axis between the aperture stop and a lens surface closest to the object side is denoted by Lf, a refractive index of the optical path deflecting prism with respect to the d line is denoted by Ndp, and a focal length of the negative lens of the front group is denoted by f1, Conditional expression (6) is satisfied, which is represented by 0.75<|Lf/(Ndp×f1)|<1 (6).

10. The objective optical system for the endoscope according to claim 9, wherein Conditional expression (6-1) is satisfied, which is represented by 0.8<|Lf/(Ndp×f1)|<0.95 (6-1).

11. The objective optical system for the endoscope according to claim 1, wherein the optical path deflecting prism includes at least one surface for bending the optical path by using total reflection.

12. The objective optical system for the endoscope according to claim 1, wherein Conditional expression (2-1) is satisfied, which is represented by $$500 < \left(\sum_{i=1}^{k}\left|(vni-vpi)\times\frac{Lci}{Rci}\right|\right)\times\left|\frac{ff}{fg}\right| < 1500. \quad (2-1)$$

13. An endoscope comprising:
the objective optical system for the endoscope according to claim 1.

14. The endoscope according to claim 13, further comprising:
an image pickup element that is disposed on an image plane of the objective optical system for the endoscope, wherein:

the front group and the rear group are adapted to be movable rotationally about an optical axis of the rear group relative to each other, and the image pickup element is formed integrally with the rear group.

* * * * *